(12) United States Patent
McKee et al.

(10) Patent No.: US 11,118,031 B2
(45) Date of Patent: Sep. 14, 2021

(54) FIBROUS STRUCTURES COMPRISING POLYSACCHARIDE FILAMENTS

(71) Applicant: The Procter & Gamble Company, Cincinnati, OH (US)

(72) Inventors: Matthew Gary McKee, Cincinnati, OH (US); Joerg Kleinwaechter, Loveland, OH (US); Geoffrey William Reynolds, Montgomery, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 14/247,592

(22) Filed: Apr. 8, 2014

(65) Prior Publication Data

US 2014/0308497 A1 Oct. 16, 2014

Related U.S. Application Data

(60) Provisional application No. 61/811,305, filed on Apr. 12, 2013.

(51) Int. Cl.
| | |
|---|---|
| *D01F 2/00* | (2006.01) |
| *D01F 9/00* | (2006.01) |
| *D01F 1/10* | (2006.01) |
| *D01F 1/06* | (2006.01) |
| *C08L 3/02* | (2006.01) |
| *D01F 6/44* | (2006.01) |

(52) U.S. Cl.
CPC .................. *C08L 3/02* (2013.01); *D01F 2/00* (2013.01); *D01F 9/00* (2013.01); *D01F 1/06* (2013.01); *D01F 1/10* (2013.01); *D01F 6/44* (2013.01); *Y10T 428/268* (2015.01); *Y10T 428/298* (2015.01)

(58) Field of Classification Search
CPC ............ D04H 1/565; D04H 1/54; D04H 1/42; D04H 3/16; D01D 5/0985; B32B 5/022; B32B 9/02; C08B 31/00; C08B 31/003; C08B 31/006; C08L 3/00; C08L 3/02; C08L 3/04; C08L 3/06; C08L 3/08; C08L 3/10
USPC ............. 428/219, 171; 442/400; 264/172.19, 264/173.11, 171.1; 510/111, 445
See application file for complete search history.

(56) References Cited

U.S. PATENT DOCUMENTS

| | | |
|---|---|---|
| 3,542,634 A | 11/1970 | Such et al. |
| 3,737,368 A | 6/1973 | Such et al. |
| 6,079,526 A | 6/2000 | Nezu et al. |
| 7,947,766 B2 | 5/2011 | Heinzman et al. |
| 8,129,449 B2 * | 3/2012 | Heinzman et al. ........ 106/145.1 |

(Continued)

FOREIGN PATENT DOCUMENTS

| | | |
|---|---|---|
| JP | S52155218 | 12/1977 |
| JP | H7109617 A | 4/1995 |

(Continued)

OTHER PUBLICATIONS

International Search Report dated Jul. 14, 2014.

*Primary Examiner* — Maria V Ewald
*Assistant Examiner* — Ethan A. Utt
(74) *Attorney, Agent, or Firm* — C. Brant Cook

(57) ABSTRACT

Polysaccharide filaments and fibrous structures containing such polysaccharide filaments and more particularly polysaccharide filaments that exhibit birefringence are provided.

13 Claims, 8 Drawing Sheets

(56) References Cited

U.S. PATENT DOCUMENTS

| | | | |
|---|---|---|---|
| 2004/0132873 A1* | 7/2004 | Bailey | C08L 3/02 |
| | | | 524/47 |
| 2005/0137330 A1 | 6/2005 | Forshey et al. | |
| 2006/0275347 A1* | 12/2006 | Evers Smith | D04H 3/14 |
| | | | 442/123 |
| 2009/0025894 A1* | 1/2009 | Barnholtz et al. | 162/141 |
| 2011/0039469 A1 | 2/2011 | Cabell et al. | |
| 2011/0151738 A1* | 6/2011 | Moore et al. | 442/334 |
| 2012/0052036 A1* | 3/2012 | Glenn et al. | 424/70.11 |
| 2012/0052037 A1* | 3/2012 | Sivik et al. | 424/70.11 |

FOREIGN PATENT DOCUMENTS

| | | |
|---|---|---|
| WO | WO 99/46119 A1 | 9/1999 |
| WO | WO 03/014217 A1 | 2/2003 |
| WO | WO 03014217 A1 * | 2/2003 |

* cited by examiner

FIBROUS STRUCTURES COMPRISING POLYSACCHARIDE FILAMENTS

FIELD OF THE INVENTION

The present invention relates to polysaccharide filaments and fibrous structures comprising such polysaccharide filaments and more particularly to polysaccharide filaments that exhibit birefringence.

BACKGROUND OF THE INVENTION

Polysaccharide structures, such as films and fibers, are known in the art. However, due to the inherent brittle properties of polysaccharides, yielding or ductile polysaccharide filaments have been until now unobtainable without the presence of plasticizers or strengthening agents such as synthetic polymers. The addition of a plasticizer to a polysaccharide results in poor wet tensile strength, making the resulting article unsuitable for a toilet tissue, paper towel, or facial tissue application. And the addition of a relatively expensive synthetic polymer is undesirable from an economic standpoint. Thus the art shows a need for a yielding or ductile polysaccharide filament without the addition of a plasticizer or a costly synthetic polymer.

Brittle and ductile failures are two modes of breaking phenomena observed for polymers (rubber-like elasticity is a third). These different types of mechanical property behavior are measured from tensile tests that generate a load vs. elongation curve. From a tensile stress vs. elongation standpoint, brittle behavior occurs when the sample fails at its maximum stress at low elongations (typically less than 10%). Ductile behavior occurs when there is a yield point in the stress-elongation curve, followed by failure at a lower stress than the yield stress. This point of failure occurs at an elongation that is much higher than for brittle materials (>>10%). Ductile behavior is the preferred mode of failure in order to achieve good flexibility and stretchability in a consumer product, such as bath tissue or paper towel.

A native starch granule is comprised of amylose and amylopectin at ~30% and ~70% respectively. The former is a linear molecule and the latter is highly branched. Under conditions where the native starch granules are completely destructured, typically under dilution and high temperature, the linear amylose molecules can preferentially orient and form intermolecular associations through hydrogen bonds. The branches of the amylopectin hinder intermolecular associations and entanglement couplings between starch molecules. It is well known in the literature that natural starch is a brittle material, and films or filaments formed from starch exhibit failure at low elongations when subjected to tensile tests. This is generally attributed to the highly branched structure of starch, which hinders entanglements and associations between starch molecules as described above. However, chemically removing the majority of the highly branched amylopectin and forming articles from amylose rich starches will also result in brittle material properties. For example, filaments produced from extruding high amylose starch compositions that exhibit temperatures during melt processing of between 143 and 155° C. and then are dried exhibit Elongation at Rupture between 2 and 5%, which fall into the mode of brittle failure.

In order to improve the mechanical properties of polysaccharide polymeric structures, for example starch films and filaments, formulators have added plasticizers to the thermoplastic starch composition with or without the inclusion of water. Typically, a mixture of starch and plasticizer are processed at a temperature and pressure required to soften the thermoplastic starch mix. In one known example, a film is produced by a method of melt processing a modified starch and external plasticizer thermoplastic composition to form a highly flexible film. The resulting film displayed improved extensibility compared to amorphous polypropylene films. However, the addition of any external plasticizer to starch compositions results in highly hygroscopic articles that will draw moisture from the air. Thus, while these articles may possess good extensibility and flexibility, they would not be useful in products that require adequate wet strength, such as sanitary tissue products.

Another strategy used by formulators to prevent brittle failure of starch-based articles is to blend the starch with a relatively large amount of a strengthening agent, such as water in-soluble, synthetic polymers. In one example, formulators have been known to blend polyamides or polyesters into a thermoplastic starch composition in an extruder in a roughly 1:1 weight ratio. The resulting biodegradable filaments are ductile and have an Elongation at Rupture greater than 50%. In another example, an injection molded article composed of starch and a copolyamide at a 1:1 weight ratio is known to exhibit a very high Elongation at Rupture. There are several other examples in the art where a high elongation film or fiber is described by blending starch with relatively large amount of a costly synthetic polymer. Clearly, the material costs associated with these articles would make the resulting structures cost prohibitive for certain applications, such as bath tissue, paper towel, or facial tissue.

A fibrous structure comprised of individual filaments that exhibit yielding behavior will display superior flexibility and stretchability compared to a fibrous structure comprised of individual filaments that are brittle and do not yield. Accordingly, there exists a need for polysaccharide fibrous structures composed of individual polysaccharide filaments that are produced from a composition comprising a polysaccharide that has been cooked at a temperature of greater than 155° C. and/or greater than 160° C. and/or greater than 165° C. and/or greater than 170° C. and/or from about 170° C. to about 175° C., for example for 1 to 2 minutes, exhibit an Elongation at Rupture greater than 100%, and/or 1) exhibit a retardance of 3 nm or greater at 10% of pixels of images of filaments as measured by the Birefringence Test Method described herein and/or 2) exhibit birefringence.

SUMMARY OF THE INVENTION

The present invention fulfills the need described above by providing polysaccharide filaments and fibrous structures comprising such filaments, wherein the filaments exhibit birefringence when stressed and/or exhibit a high Elongation at Rupture (greater than 100%).

In one example of the present invention, a method of processing an aqueous polysaccharide, such as starch, melt composition that produces polysaccharide filaments that form a fibrous structure wherein the polysaccharide filaments are ductile without the addition of plasticizer or synthetic polymer to the aqueous polysaccharide melt composition. Specifically the aqueous polysaccharide melt composition is processed such that the aqueous polysaccharide melt composition is at an elevated temperature of between 170 and 175° C. during melt processing of the aqueous polysaccharide melt composition. The aqueous polysaccharide melt composition is held at this elevated temperature for 1 to 2 minutes, and then quickly quenched, for example to about 90° C. Without being bound by theory, it is believed that raising the temperature of the aqueous polysaccharide melt composition to greater than 155° C. and/or greater than 160° C. and/or greater than 165° C. and/or between 170° C. and 175° C. results in a more homogenous aqueous polysaccharide melt composition that has fewer defects from uncooked or partially cooked polysaccharide, for example starch granules. The presence of defects can result in localized high stress regions in the spin-line and in the resulting filaments produced from the aqueous polysaccharide melt composition. In the spin-line the defects can cause filaments to prematurely break, resulting in short and brittle fibers. In the resulting filaments, the stress localization induced by the defects can serve as a failure point when the filaments are pulled. It is also believed that a higher melt processing temperature and thus a higher aqueous polysaccharide melt composition temperature results in an aqueous polysaccharide melt composition having fewer associations between polysaccharide molecules, for example starch molecules, which may also act as defects in the spin-line.

In one example of the present invention, a fibrous structure comprising a plurality of filaments wherein the filaments comprise greater than 85% and/or greater than 88% and/or greater than 90% and/or greater than 92% and/or greater than 95% by weight of a polysaccharide, for example starch and/or starch derivative, wherein 10% of pixels of images of the filaments exhibit a retardance of 3 nm or greater and/or about 3.5 nm or greater and/or about 4 nm or greater as measured according to the Birefringence Test Method described herein is provided.

In another example of the present invention, a polysaccharide, for example starch and/or starch derivative, filament comprising a polysaccharide, for example greater than 85% and/or greater than 88% and/or greater than 90% and/or greater than 92% and/or greater than 95% by weight of a polysaccharide, for example starch and/or starch derivative, wherein the polysaccharide filament exhibits an Elongation at Rupture of greater than 100% and/or greater than 110% and/or greater than 125% and/or greater than 135% and/or greater than 150% as measured according to the Elongation at Rupture Test Method described herein is provided.

Accordingly, the present invention provides polysaccharide filaments and fibrous structures comprising such filaments that overcome the negatives described above by exhibiting birefringence and/or an Elongation at Rupture greater than known polysaccharide filaments.

DETAILED DESCRIPTION OF THE INVENTION

Figure 1:
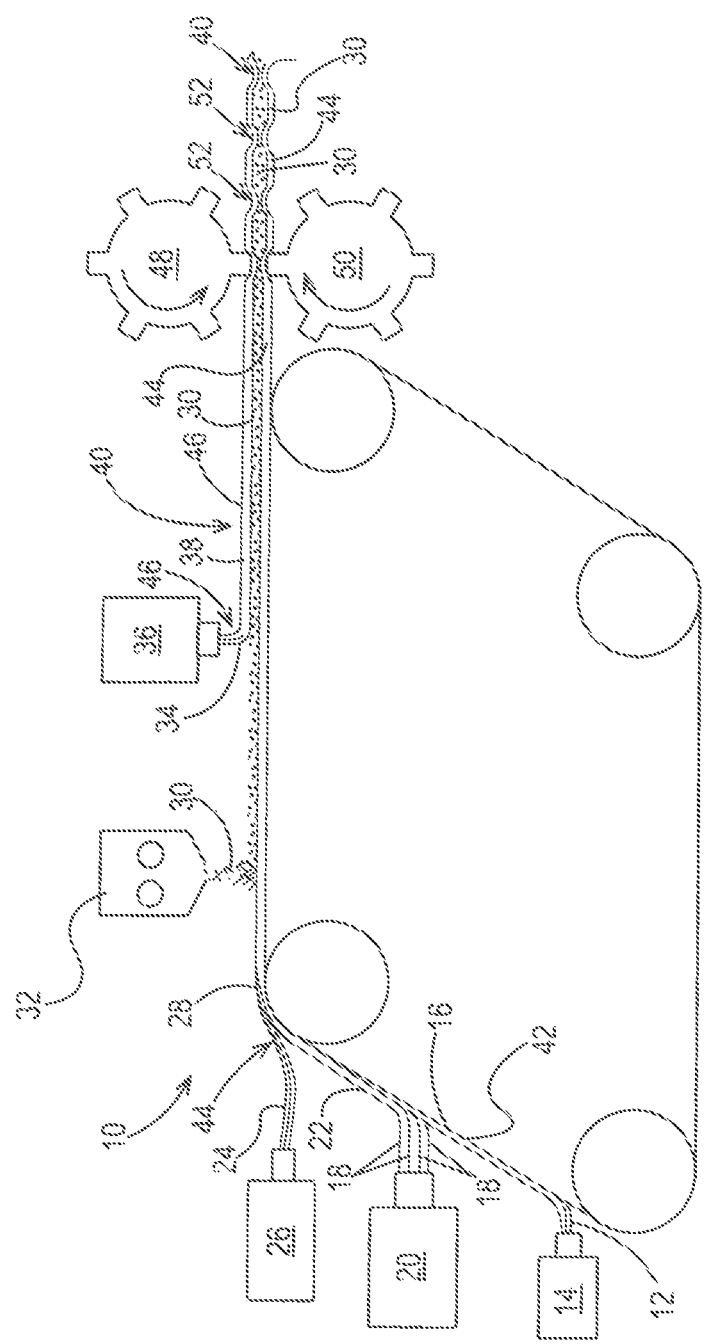
FIG. 1 is a schematic representation of one example of a method for making a fibrous structure according to the present invention.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol, thermoplastic polymer, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments.

"Fiber" as used herein means an elongate particulate as described above that exhibits a length of less than 5.08 cm (2 in.) and/or less than 3.81 cm (1.5 in.) and/or less than 2.54 cm (1 in.).

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers.

Staple fibers may be produced by spinning a filament tow and then cutting the tow into segments of less than 5.08 cm (2 in.) thus producing fibers.

In one example of the present invention, a fiber may be a naturally occurring fiber, which means it is obtained from a naturally occurring source, such as a vegetative source, for example a tree and/or plant, such as trichomes. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to fibrous structures made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In addition to the various wood pulp fibers, other cellulosic fibers such as cotton linters, rayon, lyocell, and bagasse fibers can be used in the fibrous structures of the present invention.

"Fibrous structure" as used herein means a structure that comprises one or more fibrous elements. In one example, a fibrous structure according to the present invention means an association of fibrous elements that together form a structure capable of performing a function. In another example of the present invention, a fibrous structure comprises a plurality of inter-entangled fibrous elements, for example filaments.

"Sanitary tissue product" as used herein means a soft, relatively low density fibrous structure useful as a wiping implement for post-urinary and post-bowel movement cleaning (toilet tissue), for otorhinolaryngological discharges (facial tissue), multi-functional absorbent and cleaning uses (absorbent towels) and wipes, such as wet and dry wipes. The sanitary tissue product may be convolutedly wound upon itself about a core or without a core to form a sanitary tissue product roll or may be in the form of discrete sheets.

In one example, the sanitary tissue product of the present invention comprises one or more fibrous structures according to the present invention.

The sanitary tissue products and/or fibrous structures of the present invention may exhibit a basis weight between about 1 g/m$^2$ to about 5000 g/m$^2$ and/or from about 10 g/m$^2$ to about 500 g/m$^2$ and/or from about 10 g/m$^2$ to about 300 g/m$^2$ and/or from about 10 g/m$^2$ to about 120 g/m$^2$ and/or from about 15 g/m$^2$ to about 110 g/m$^2$ and/or from about 20 g/m$^2$ to about 100 g/m$^2$ and/or from about 30 to 90 g/m$^2$ as determined by the Basis Weight Test Method described herein. In addition, the sanitary tissue product of the present invention may exhibit a basis weight between about 40 g/m$^2$ to about 120 g/m$^2$ and/or from about 50 g/m$^2$ to about 110 g/m$^2$ and/or from about 55 g/m$^2$ to about 105 g/m$^2$ and/or from about 60 g/m$^2$ to 100 g/m$^2$ as determined by the Basis Weight Test Method described herein.

The sanitary tissue products of the present invention may exhibit a total dry tensile strength of greater than about 59 g/cm and/or from about 78 g/cm to about 394 g/cm and/or from about 98 g/cm to about 335 g/cm. In addition, the sanitary tissue product of the present invention may exhibit a total dry tensile strength of greater than about 196 g/cm and/or from about 196 g/cm to about 394 g/cm and/or from about 216 g/cm to about 335 g/cm and/or from about 236 g/cm to about 315 g/cm. In one example, the sanitary tissue product exhibits a total dry tensile strength of less than about 394 g/cm and/or less than about 335 g/cm as measured according to the Elongation/Tensile Strength/TEA/Tangent Modulus Test Method described herein.

The sanitary tissue products of the present invention may exhibit a density of less than 0.60 g/cm$^3$ and/or less than 0.30 g/cm$^3$ and/or less than 0.20 g/cm$^3$ and/or less than 0.15 g/cm$^3$ and/or less than 0.10 g/cm$^3$ and/or less than 0.07 g/cm$^3$ and/or less than 0.05 g/cm$^3$ and/or from about 0.01 g/cm$^3$ to about 0.20 g/cm$^3$ and/or from about 0.02 g/cm$^3$ to about 0.15 g/cm$^3$ and/or from about 0.02 g/cm$^3$ to about 0.10 g/cm$^3$.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets.

The sanitary tissue products of the present invention may comprise additives such as softening agents, temporary wet strength agents, permanent wet strength agents, bulk softening agents, lotions, silicones, wetting agents, latexes, patterned latexes and other types of additives suitable for inclusion in and/or on sanitary tissue products.

"Scrim" as used herein means a material that is used to overlay solid additives within the fibrous structures of the present invention such that the solid additives are positioned between the scrim and a layer of the fibrous structure. In one example, the scrim covers the solid additives such that they are positioned between the scrim and a surface of a nonwoven substrate of the fibrous structure. In another example, the scrim is a minor component (for example less than 25% of the basis weight) relative to the nonwoven substrate of the basis weight of the fibrous structure.

"Hydroxyl polymer" as used herein includes any hydroxyl-containing polymer that can be incorporated into a filament of the present invention. In one example, the hydroxyl polymer of the present invention includes greater than 10% and/or greater than 20% and/or greater than 25% by weight hydroxyl moieties. In another example, the hydroxyl within the hydroxyl-containing polymer is not part of a larger functional group such as a carboxylic acid group.

"Non-thermoplastic" as used herein means, with respect to a material, such as a fibrous element as a whole and/or a polymer, such as a crosslinked polymer, within a fibrous element, that the fibrous element and/or polymer exhibits no melting point and/or softening point, which allows it to flow under pressure, in the absence of a plasticizer, such as water, glycerin, sorbitol, urea and the like.

"Thermoplastic" as used herein means, with respect to a material, such as a fibrous element as a whole and/or a polymer within a fibrous element, that the fibrous element and/or polymer exhibits a melting point and/or softening point at a certain temperature, which allows it to flow under pressure.

"Non-cellulose-containing" as used herein means that less than 5% and/or less than 3% and/or less than 1% and/or less than 0.1% and/or 0% by weight of cellulose polymer, cellulose derivative polymer and/or cellulose copolymer is present in fibrous element. In one example, "non-cellulose-containing" means that less than 5% and/or less than 3% and/or less than 1% and/or less than 0.1% and/or 0% by weight of cellulose polymer is present in fibrous element.

"Fast wetting surfactant" as used herein means a surfactant that exhibits a Critical Micelle Concentration of greater 0.15% by weight and/or at least 0.25% and/or at least 0.50% and/or at least 0.75% and/or at least 1.0% and/or at least 1.25% and/or at least 1.4% and/or less than 10.0% and/or less than 7.0% and/or less than 4.0% and/or less than 3.0% and/or less than 2.0% by weight.

"Aqueous polymer melt composition" or "aqueous polysaccharide melt composition" as used herein means a composition comprising water and a melt processed polymer, such as a melt processed fibrous element-forming polymer, for example a melt processed hydroxyl polymer, such as a melt processed polysaccharide.

"Melt processed fibrous element-forming polymer" as used herein means any polymer, which by influence of elevated temperatures, pressure and/or external plasticizers may be softened to such a degree that it can be brought into a flowable state, and in this condition may be shaped as desired.

"Melt processed hydroxyl polymer" as used herein means any polymer that contains greater than 10% and/or greater than 20% and/or greater than 25% by weight hydroxyl groups and that has been melt processed, with or without the aid of an external plasticizer. More generally, melt processed hydroxyl polymers include polymers, which by the influence of elevated temperatures, pressure and/or external plasticizers may be softened to such a degree that they can be brought into a flowable state, and in this condition may be shaped as desired.

"Blend" as used herein means that two or more materials, such as a fibrous element-forming polymer, for example a hydroxyl polymer and an ammonium alkylsulfonate salt and/or acid are in contact with each other, such as mixed together homogeneously or non-homogeneously, within a filament. In other words, a filament formed from one material, but having an exterior coating of another material is not a blend of materials for purposes of the present invention. However, a fibrous element formed from two different materials is a blend of materials for purposes of the present invention even if the fibrous element further comprises an exterior coating of a material.

"Associate," "Associated," "Association," and/or "Associating" as used herein with respect to fibrous elements means combining, either in direct contact or in indirect contact, fibrous elements such that a fibrous structure is formed. In one example, the associated fibrous elements may be bonded together for example by adhesives and/or thermal bonds. In another example, the fibrous elements may be associated with one another by being deposited onto the same fibrous structure making belt.

"Weight average molecular weight" as used herein means the weight average molecular weight as determined using gel permeation chromatography as generally described in Colloids and Surfaces A. Physico Chemical & Engineering Aspects, Vol. 162, 2000, pg. 107-121 and detailed in the Weight Average Molecular Weight Test Method described herein.

"Average Diameter" as used herein, with respect to a fibrous element, is measured according to the Average Diameter Test Method described herein. In one example, a fibrous element of the present invention exhibits an average diameter of less than 50 µm and/or less than 25 µm and/or less than 20 µm and/or less than 15 µm and/or less than 10 µm and/or less than 6 µm and/or greater than 1 µm and/or greater than 3 µm.

"Basis Weight" as used herein is the weight per unit area of a sample reported in lbs/3000 ft$^2$ or g/m$^2$ as determined by the Basis Weight Test Method described herein.

"Machine Direction" or "MD" as used herein means the direction parallel to the flow of the fibrous structure through a fibrous structure making machine and/or sanitary tissue product manufacturing equipment. Typically, the MD is substantially perpendicular to any perforations present in the fibrous structure "Cross Machine Direction" or "CD" as used herein means the direction perpendicular to the machine direction in the same plane of the fibrous structure and/or sanitary tissue product comprising the fibrous structure.

"Ply" or "Plies" as used herein means an individual fibrous structure optionally to be disposed in a substantially contiguous, face-to-face relationship with other plies, forming a multiple ply fibrous structure. It is also contemplated that a single fibrous structure can effectively form two "plies" or multiple "plies", for example, by being folded on itself.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Fibrous Structure

The fibrous structures of the present invention may comprise a plurality of filaments comprising greater than 85% and/or greater than 88% and/or greater than 90% and/or greater than 92% and/or greater than 95% by weight of a polysaccharide, wherein 10% of pixels of images of the filaments exhibit a retardance of 3 nm or greater and/or about 3.5 nm or greater and/or about 4 nm or greater as measured according to the Birefringence Test Method described herein.

Table 1 below shows the retardance at 10% of pixels of images of filaments for an inventive example and a comparative example as measured by the Birefringence Test Method described herein.

TABLE 1

| Sample | Retardance at 10% pixels of images of filaments in fibrous structure (nm) |
| --- | --- |
| Inventive Example | 3.96 nm |
| Comparative Example | 2.2 nm |

Fibrous Elements

The fibrous elements of the present invention comprise a fibrous element-forming polymer, such as a hydroxyl polymer, for example a crosslinked hydroxyl polymer, and an ammonium alkylsulfonate salt and/or acid. In one example, the fibrous elements may comprise two or more fibrous element-forming polymers, such as two or more hydroxyl polymers. In another example, the fibrous elements may comprise two or more ammonium alkylsulfonate salts and/or acids. In another example, the fibrous elements may comprise two or more ammonium salts at least one of which is an ammonium alkylsulfonate salt, such as ammonium methanesulfonate, and one of which is not ammonium alkylsulfonate salt, such as ammonium toluenesulfonate. In another example, the fibrous element may comprise two or more fibrous element-forming polymers, such as two or more hydroxyl polymers, at least one of which is starch and/or a starch derivative and one of which is a non-starch and/or non-starch derivative, such as polyvinyl alcohol. In still another example, the fibrous elements of the present invention may comprise two or more fibrous element-forming polymers at least one of which is a hydroxyl polymer and at least one of which is a non-hydroxyl polymer.

In yet another example, the fibrous elements of the present invention may comprise two or more non-hydroxyl polymers. In one example, at least one of the non-hydroxyl polymers exhibits a weight average molecular weight of greater than 1,400,000 g/mol and/or is present in the fibrous elements at a concentration greater than its entanglement concentration ($C_e$) and/or exhibits a polydispersity of greater than 1.32.

In one example, the fibrous element comprises a filament. In another example, the fibrous element comprises a fiber, such as a filament that has been cut into fibers.

Crosslinking System

A crosslinking system comprising a crosslinking agent capable of crosslinking a fibrous element-forming polymer, for example a hydroxyl polymer, and a crosslinking facilitator are present in the aqueous polymer melt composition of the present invention. The crosslinking results in a crosslinked polysaccharide.

The crosslinking agent and/or crosslinking facilitator may be added to the aqueous polymer melt composition, for example before polymer processing of the aqueous polymer melt composition. The crosslinking agent and/or crosslinking facilitator are present in the fibrous elements produced from the aqueous polymer melt compositions of the present invention.

Upon crosslinking the hydroxyl polymer during the curing step, the crosslinking agent becomes an integral part of the filament as a result of crosslinking the hydroxyl polymer as shown in the following schematic representation:

Hydroxyl Polymer—Crosslinking Agent—Hydroxyl Polymer

"Crosslinking facilitator" as used herein means any material that is capable of activating a crosslinking agent thereby transforming the crosslinking agent from its unactivated state to its activated state. In other words, when a crosslinking agent is in its unactivated state, the hydroxyl polymer present in the aqueous polymer melt composition does not undergo unacceptable crosslinking Unacceptable crosslinking causes the shear viscosity and n value to fall outside the ranges specified which are determined according to the Shear Viscosity of a Polymer Melt Composition Measurement Test Method. In the case of imidazolidinone crosslinkers, the pH and the temperature of the aqueous polymer melt composition should be in the desired ranges, from pH of from about 2 to about 11 and/or from about 2.5 to about 9 and/or from about 3 to about 8.5 and/or from about 3.2 to about 8 and/or from about 3.2 to about 7.5 as measured by the Polymer Melt Composition pH Test Method described herein; unacceptable crosslinking occurs outside these ranges.

In one example, the filaments and/or aqueous polymer melt composition of the present invention comprise one or more crosslinking facilitators.

For example, a crosslinking facilitator salt being chemically changed to its acid form and vice versa.

Non-limiting examples of suitable crosslinking facilitators of the present invention include ammonium salts of methanesulfonic acid, ethanesulfonic acid, propanesulfonic acid, isopropylsulfonic acid, butanesulfonic acid, isobutylsulfonic acid, sec-butylsulfonic acids.

The ammonium alkylsulfonate salt of the present invention may have the following formula (I):

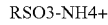
RSO3-NH4+    I where R is a C1-C18 alkyl and/or a C1-C12 alkyl and/or a C1-C8 alkyl group.

Non-limiting examples of suitable alkyl groups are selected from the group consisting of: methyl, ethyl, propyl, butyl, octyl, decyl, and dodecyl.

In one example, the crosslinking facilitator of the present invention may comprise one or more ammonium alkylsulfonate salts and/or derivatives of the alkylsulfonate salts that may exist after the transformation/activation of the crosslinking agent. In one example, the crosslinking facilitator may comprise an ammonium salt of trifluoromethanesulfonic acid.

In addition, metal salts, such as magnesium and zinc salts, can be used in combination with the ammonium alkylsulfonate salts and/or acids thereof, as additional crosslinking facilitators.

The crosslinking facilitator may include derivatives of the material that may exist after the transformation/activation of the crosslinking agent. For example, a crosslinking facilitator salt being chemically changed to its acid form and vice versa.

Non-limiting examples of additional suitable crosslinking facilitators include acids having a pKa of between 2 and 6 or salts thereof. The crosslinking facilitators may be Brønsted Acids and/or salts thereof, such as ammonium salts thereof.

In addition, metal salts, such as magnesium and zinc salts, can be used alone or in combination with Brønsted Acids and/or salts thereof, as crosslinking facilitators.

Non-limiting examples of such suitable crosslinking facilitators include benzoic acid, citric acid, formic acid, glycolic acid, lactic acid, maleic acid, phthalic acid, phosphoric acid, hypophosphoric acid, succinic acid, and mixtures thereof and/or their salts, such as their ammonium salts, such as ammonium glycolate, ammonium citrate, ammonium chloride, ammonium sulfate Additional non-limiting examples of suitable crosslinking facilitators include glyoxal bisulfite salts, primary amine salts, such as hydroxyethyl ammonium salts, hydroxypropyl ammonium salt, secondary amine salts, ammonium toluene sulfonate, ammonium benzene sulfonate, ammonium xylene sulfonate, magnesium chloride, and zinc chloride.

The crosslinking facilitator may be present in the filament at a level of from about 0.1% to 5% and/or from about 0.15% to about 4% and/or from about 0.2% to about 2% by weight of the filament.

In one example, the crosslinking facilitators, filaments, and aqueous polymer melt compositions are void or essentially void (less than 0.025% by weight) of kosmotropic salts, such as ammonium sulfate and ammonium citrate. The inclusion 0.025% and greater of a kosmotropic salt, such as ammonium sulfate, even when an ammonium alkysulfonate salt and/or acid is present, may negatively impact the properties, such as strength (for example TEA), of the filaments. However, the inclusion of an amount of an ammonium salt, such as ammonium chloride, for example an amount that does not produce negative corrosive effects in the processing and spinning equipment, in combination with an ammonium alkylsulfonate salt may be desired.

Fibrous Element-Forming Polymers

The aqueous polymer melt compositions of the present invention and/or polymer structures, for example fibrous elements, such as filaments and/or fibers, of the present invention that associate to form fibrous structures of the present invention contain at least one fibrous element-forming polymer, such as a hydroxyl polymer, and may contain other types of polymers such as non-hydroxyl polymers that exhibit weight average molecular weights of greater than 500,000 g/mol, and mixtures thereof as determined by the Weight Average Molecular Weight Test Method described herein.

Non-limiting examples of hydroxyl polymers in accordance with the present invention include polyols, such as polyvinyl alcohol, polyvinyl alcohol derivatives, polyvinyl alcohol copolymers, starch, starch derivatives, starch copolymers, chitosan, chitosan derivatives, chitosan copolymers, cellulose, cellulose derivatives such as cellulose ether and ester derivatives, cellulose copolymers, hemicellulose, hemicellulose derivatives, hemicellulose copolymers, gums, arabinans, galactans, proteins and various other polysaccharides and mixtures thereof.

In one example, a hydroxyl polymer of the present invention comprises a polysaccharide.

In another example, a hydroxyl polymer of the present invention comprises a non-thermoplastic polymer.

The hydroxyl polymer may have a weight average molecular weight of from about 10,000 g/mol to about 40,000,000 g/mol and/or greater than 100,000 g/mol and/or greater than 1,000,000 g/mol and/or greater than 3,000,000 g/mol and/or greater than 3,000,000 g/mol to about 40,000,000 g/mol as determined by the Weight Average Molecular Weight Test Method described herein. Higher and lower molecular weight hydroxyl polymers may be used in combination with hydroxyl polymers having a certain desired weight average molecular weight.

Polyvinyl alcohols herein can be grafted with other monomers to modify its properties. A wide range of monomers has been successfully grafted to polyvinyl alcohol. Non-limiting examples of such monomers include vinyl acetate, styrene, acrylamide, acrylic acid, 2-hydroxyethyl methacrylate, acrylonitrile, 1,3-butadiene, methyl methacrylate, methacrylic acid, vinylidene chloride, vinyl chloride, vinyl amine and a variety of acrylate esters. Polyvinyl alcohols comprise the various hydrolysis products formed from polyvinyl acetate. In one example the level of hydrolysis of the polyvinyl alcohols is greater than 70% and/or greater than 88% and/or greater than 95% and/or about 99%.

"Polysaccharides" as used herein means natural polysaccharides and polysaccharide derivatives and/or modified polysaccharides. Suitable polysaccharides include, but are not limited to, starches, starch derivatives, starch copolymers, chitosan, chitosan derivatives, chitosan copolymers, cellulose, cellulose derivatives, cellulose copolymers, hemicellulose, hemicellulose derivatives, hemicelluloses copolymers, gums, arabinans, galactans, and mixtures thereof. The polysaccharide may exhibit a weight average molecular weight of from about 10,000 to about 40,000,000 g/mol and/or greater than about 100,000 and/or greater than about 1,000,000 and/or greater than about 3,000,000 and/or greater than about 3,000,000 to about 40,000,000 as determined by the Weight Average Molecular Weight Test Method described herein.

The polysaccharides of the present invention may comprise non-cellulose and/or non-cellulose derivative and/or non-cellulose copolymer hydroxyl polymers. Non-limiting example of such non-cellulose polysaccharides may be selected from the group consisting of: starches, starch derivatives, starch copolymers, chitosan, chitosan derivatives, chitosan copolymers, hemicellulose, hemicellulose derivatives, hemicelluloses copolymers, and mixtures thereof.

In one example, the hydroxyl polymer comprises starch, a starch derivative and/or a starch copolymer. In another example, the hydroxyl polymer comprises starch and/or a starch derivative. In yet another example, the hydroxyl polymer comprises starch. In one example, the hydroxyl polymer comprises ethoxylated starch. In another example, the hydroxyl polymer comprises acid-thinned starch. In still another example, the hydroxyl polymer comprises Dent corn starch.

As is known, a natural starch can be modified chemically or enzymatically, as well known in the art. For example, the natural starch can be acid-thinned, hydroxy-ethylated, hydroxy-propylated, ethersuccinylated or oxidized. In one example, the starch comprises a high amylopectin natural starch (a starch that contains greater than 75% and/or greater than 90% and/or greater than 98% and/or about 99% amylopectin). Such high amylopectin natural starches may be derived from agricultural sources, which offer the advantages of being abundant in supply, easily replenishable and relatively inexpensive. Chemical modifications of starch typically include acid or alkaline-catalyzed hydrolysis and chain scission (oxidative and/or enzymatic) to reduce molecular weight and molecular weight distribution. Suitable compounds for chemical modification of starch include organic acids such as citric acid, acetic acid, glycolic acid, and adipic acid; inorganic acids such as hydrochloric acid, sulfuric acid, nitric acid, phosphoric acid, boric acid, and partial salts of polybasic acids, e.g., $KH_2PO_4$, $NaHSO_4$; group Ia or IIa metal hydroxides such as sodium hydroxide, and potassium hydroxide; ammonia; oxidizing agents such as hydrogen peroxide, benzoyl peroxide, ammonium persulfate, potassium permanganate, hypochloric salts, and the like; and mixtures thereof.

"Modified starch" is a starch that has been modified chemically or enzymatically. The modified starch is contrasted with a native starch, which is a starch that has not been modified, chemically or otherwise, in any way.

Chemical modifications may also include derivatization of starch by reaction of its hydroxyl groups with alkylene oxides, and other ether-, ester-, urethane-, carbamate-, or isocyanate-forming substances. Hydroxyalkyl, ethersuccinylated, acetyl, or carbamate starches or mixtures thereof can be used as chemically modified starches. The degree of substitution of the chemically modified starch is from 0.001 to 3.0, and more specifically from 0.003 to 0.2. Biological modifications of starch may include bacterial digestion of the carbohydrate bonds, or enzymatic hydrolysis using enzymes such as amylase, amylopectase, and the like.

Generally, all kinds of natural starches can be used in the present invention. Suitable naturally occurring starches can include, but are not limited to: corn starch, potato starch, sweet potato starch, wheat starch, sago palm starch, tapioca starch, rice starch, soybean starch, arrow root starch, amioca starch, bracken starch, lotus starch, waxy maize starch, and high amylose corn starch. Naturally occurring starches, particularly corn starch and wheat starch, can be particularly beneficial due to their low cost and availability.

In one example, to generate rheological properties suitable for high-speed fibrous element spinning processes, the molecular weight of the natural, unmodified starch may be reduced. The optimum molecular weight is dependent on the type of starch used. For example, a starch with a low level of amylose component, such as a waxy maize starch, disperses rather easily in an aqueous solution with the application of heat and does not retrograde or recrystallize significantly. With these properties, a waxy maize starch can be used at a weight average molecular weight, for example in the range of 500,000 g/mol to 40,000,000 g/mol as determined by the Weight Average Molecular Weight Test Method described herein. Modified starches such as hydroxy-ethylated Dent corn starch, which contains about 25% amylose, or oxidized Dent corn starch tend to retrograde more than waxy maize starch but less than acid thinned starch. This retrogradation, or recrystallization, acts as a physical cross-linking to effectively raise the weight average molecular weight of the starch in aqueous solution. Therefore, an appropriate weight average molecular weight for a typical commercially available hydroxyethylated Dent corn starch with 2 wt. % hydroxyethylation or oxidized Dent corn starch is from about 200,000 g/mol to about 10,000,000 g/mol. For ethoxylated starches with higher degrees of ethoxylation, for example a hydroxyethylated Dent corn starch with 5 wt % hydroxyethylation, weight average molecular weights of up to 40,000,000 g/mol as determined by the Weight Average Molecular Weight Test Method described herein may be suitable for the present invention. For acid thinned Dent corn starch, which tends to retrograde more than oxidized Dent corn starch, the appropriate weight average molecular weight is from about 100,000 g/mol to about 15,000,000 g/mol as determined by the Weight Average Molecular Weight Test Method described herein.

The weight average molecular weight of starch may also be reduced to a desirable range for the present invention by physical/mechanical degradation (e.g., via the thermomechanical energy input of the processing equipment).

The natural starch can be hydrolyzed in the presence of an acid catalyst to reduce the molecular weight and molecular weight distribution of the composition. The acid catalyst can be selected from the group consisting of hydrochloric acid, sulfuric acid, phosphoric acid, citric acid, ammonium chloride and any combination thereof. Also, a chain scission agent may be incorporated into a spinnable starch composition such that the chain scission reaction takes place substantially concurrently with the blending of the starch with other components. Non-limiting examples of oxidative chain scission agents suitable for use herein include ammonium persulfate, hydrogen peroxide, hypochlorite salts, potassium permanganate, and mixtures thereof.

Typically, the chain scission agent is added in an amount effective to reduce the weight average molecular weight of the starch to the desirable range. It is found that compositions having modified starches in the suitable weight average molecular weight ranges have suitable shear viscosities, and thus improve processability of the composition. The improved processability is evident in less interruptions of the process (e.g., reduced breakage, shots, defects, hang-ups) and better surface appearance and strength properties of the final product, such as fibers of the present invention.

In one example, the fibrous element of the present invention is void of thermoplastic, water-insoluble polymers.

Other Polymers

The aqueous polymer melt compositions of the present invention and/or filament of the present invention may comprise, in addition to the fibrous element-forming polymer, other polymers, such as non-hydroxyl polymers.

Non-limiting examples of suitable non-hydroxyl polymers that may be included in the fibrous elements of the present invention include non-hydroxyl polymers that exhibit a weight average molecular weight of greater than 500,000 g/mol and/or greater than 750,000 g/mol and/or greater than 1,000,000 g/mol and/or greater than 1,250,000 g/mol and/or at greater than 1,400,000 g/mol and/or at least 1,450,000 g/mol and/or at least 1,500,000 g/mol and/or less than 10,000,000 g/mol and/or less than 5,000,000 g/mol and/or less than 2,500,00 g/mol and/or less than 2,000,000 g/mol and/or less than 1,750,000 g/mol as determined by the Weight Average Molecular Weight Test Method described herein.

In one example, the non-hydroxyl polymer exhibits a polydispersity of greater than 1.10 and/or at least 1.20 and/or at least 1.30 and/or at least 1.32 and/or at least 1.40 and/or at least 1.45.

In another example, the non-hydroxyl polymer exhibits a concentration greater than its entanglement concentration (Ce) and/or a concentration greater than 1.2 times its entanglement concentration (Ce) and/or a concentration greater than 1.5 times its entanglement concentration (Ce) and/or a concentration greater than twice its entanglement concentration (Ce) and/or a concentration greater than 3 times its entanglement concentration (Ce).

Non-limiting examples of suitable non-hydroxyl polymers include polyacrylamide and derivatives such as carboxyl modified polyacrylamide polymers and copolymers including polyacrylic, poly(hydroxyethyl acrylic), polymethacrylic acid and their partial esters; vinyl polymers including polyvinylalcohol, polyvinylpyrrolidone, and the like; polyamides; polyalkylene oxides such as polyethylene oxide and mixtures thereof. Copolymers or graft copolymers made from mixtures of monomers selected from the aforementioned polymers are also suitable herein. Non-limiting examples of commercially available polyacrylamides include nonionic polyacrylamides such as N300 from Kemira or HYPERFLOC® NF221, NF301, and NF241 from Hychem, Inc.

Typically, the non-hydroxyl polymers are present in an amount of from about 0.01% to about 10% and/or from about 0.05% to about 5% and/or from about 0.075% to about 2.5% and/or from about 0.1% to about 1%, by weight of the aqueous polymer melt composition, filament and/or fibrous structure.

In yet another example, the non-hydroxyl polymer comprises a linear polymer. In another example, the non-hydroxyl polymer comprises a long chain branched polymer. In still another example, the non-hydroxyl polymer is compatible with the hydroxyl polymer at a concentration greater than the non-hydroxyl polymer's entanglement concentration $C_e$.

Non-limiting examples of suitable non-hydroxyl polymers are selected from the group consisting of: polyacrylamide and its derivatives; polyacrylic acid, polymethacrylic acid and their esters; polyethyleneimine; copolymers made from mixtures of the aforementioned polymers; and mixtures thereof. In one example, the non-hyrdoxyl polymer comprises polyacrylamide. In one example, the fibrous elements comprises two or more non-hydroxyl polymers, such as two or more polyacrylamides, such at two or more different weight average molecular weight polyacrylamides.

Fast Wetting Surfactants

Any suitable fast wetting surfactant may be present in the aqueous hydroxyl polymer melt composition and/or filament of the present invention. Non-limiting examples of suitable fast wetting surfactants include surfactants that exhibit a twin-tailed general structure, for example a surfactant that exhibits a structure IIA or IIB as follows.

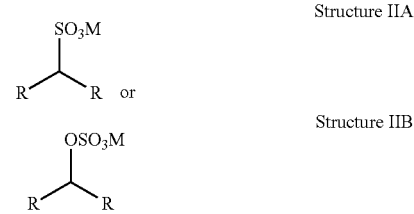

wherein R is independently selected from substituted or unsubstituted, linear or branched aliphatic groups and mixtures thereof. In one example, R is independently selected from substituted or unsubstituted, linear or branched $C_4$-$C_7$ aliphatic chains and mixtures thereof. In another example, R is independently selected from substituted or unsubstituted, linear or branched $C_4$-$C_7$ alkyls and mixtures thereof. In another example, R is independently selected from substituted or unsubstituted, linear or branched $C_5$-$C_6$ alkyls and mixtures thereof. In still another example, R is independently selected from substituted or unsubstituted, linear or branched $C_6$ alkyls and mixtures thereof. In even another example, R is an unsubstituted, branched $C_6$ alkyl having the following structure III.

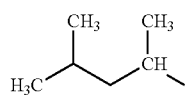

Structure III

In another example, R is independently selected from substituted or unsubstituted, linear or branched $C_5$ alkyls and mixtures thereof. In yet another example, R is independently selected from unsubstituted, linear $C_5$ alkyls and mixtures thereof. The $C_5$ alkyl may comprise a mixture of unsubstituted linear $C_5$ alkyls, for example $C_5$ n-pentyl, and/or 1-methyl branched $C_5$ alkyls as shown in the following structure IV.

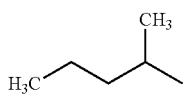

Structure IV

In even another example, R comprises a mixture of $C_4$-$C_7$ alkyls and/or a mixture of $C_5$-$C_6$ alkyls.

The fast wetting surfactants may be present in the aqueous polymer melt compositions, fibrous elements, and/or fibrous structures of the present invention, alone or in combination with other non-fast wetting surfactants.

In one example, the fast wetting surfactants of the present invention may be used individually or in mixtures with each other or in a mixture with one or more non-fast wetting surfactants, for example a $C_8$ sulfosuccinate surfactant where R is the following structure V

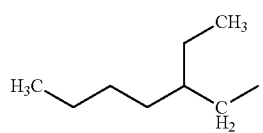

Structure V

In one example a fast wetting surfactant comprises a sulfosuccinate surfactant having the following structure VI.

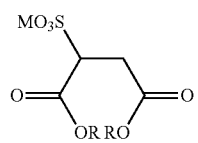

Structure VI wherein R is independently selected from substituted or unsubstituted, linear or branched aliphatic groups and mixtures thereof. In one example, R is independently selected from substituted or unsubstituted, linear or branched $C_4$-$C_7$ aliphatic chains and mixtures thereof. In another example, R is independently selected from substituted or unsubstituted, linear or branched $C_4$-$C_7$ alkyls and mixtures thereof. In another example, R is independently selected from substituted or unsubstituted, linear or branched $C_5$-$C_6$ alkyls and mixtures thereof. In still another example, R is independently selected from substituted or unsubstituted, linear or branched $C_6$ alkyls and mixtures thereof. In even another example, R is an unsubstituted, branched $C_6$ alkyl having the following structure III.

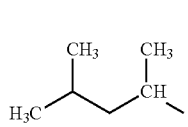

Structure III

Non-limiting examples of fast wetting surfactants according to the present invention include sulfosuccinate surfactants, for example a sulfosuccinate surfactant that has structure III as its R groups (AEROSOL® MA-80), a sulfosuccinate surfactant that has $C_4$ isobutyl as its R groups (AEROSOL® IB), and a sulfosuccinate surfactant that has a mixture of $C_5$ n-pentyl and structure IV as its R groups (AEROSOL® AY), all commercially available from Cytec.

Additional non-limiting examples of fast wetting surfactants according to the present invention include alcohol sulfates derived from branched alcohols such as ISAL-CHEM® and LIAL® alcohols (from Sasol) ie. DACPON® 27 23 AS and GUERBET® alcohols from Lucky Chemical. Still another example of a fast wetting surfactant includes paraffin sulfonates such as HOSTAPUR® SAS30 from Clariant.

Typically, the fast wetting surfactants are present in an amount of from about 0.01% to about 5% and/or from about 0.5% to about 2.5% and/or from about 1% to about 2% and/or from about 1% to about 1.5%, by weight of the aqueous polymer melt composition, filament and/or fibrous structure.

In one example, the fast wetting surfactants of the present invention exhibit a Minimum Surface Tension in Distilled Water of less than 34.0 and/or less than 33.0 and/or less than 32.0 and/or less than 31.0 and/or less than 30.0 and/or less than 29.0 and/or less than 28.0 and/or less than 27.0 and/or less than 26.75 and/or less than 26.5 and/or less than 26.2 and/or less than 25.0 mN/m and/or to greater than 0 and/or greater than 1.0 mN/m.

In still another example, the fast wetting surfactants of the present invention exhibit a CMC of greater than 0.15% and/or at least 0.25% and/or at least 0.50% and/or at least 0.75% and/or at least 1.0% and/or at least 1.25% and/or at least 1.4% and/or less than 10.0% and/or less than 7.0% and/or less than 4.0% and/or less than 3.0% and/or less than 2.0% by weight and a Minimum Surface Tension in Distilled Water of less than 34.0 and/or less than 33.0 and/or less than 32.0 and/or less than 31.0 and/or less than 30.0 and/or less than 29.0 and/or less than 28.0 and/or less than 27.0 and/or less than 26.75 and/or less than 26.5 and/or less than 26.2 and/or less than 25.0 mN/m and/or to greater than 0 and/or greater than 1.0 mN/m. In even another example, the fast wetting surfactants of the present invention exhibit a CMC of at least 1.0% and/or at least 1.25% and/or at least 1.4% and/or less than 4.0% and/or less than 3.0% and/or less than 2.0% by weight and a Minimum Surface Tension in Distilled Water of less than 34.0 and/or less than 33.0 and/or less than 32.0 and/or less than 31.0 and/or less than 30.0 and/or less than 29.0 and/or less than 28.0 and/or less than 27.0 and/or less than 26.75 and/or less than 26.5 and/or less than 26.2 and/or less than 25.0 mN/m and/or to greater than 0 and/or greater than 1.0 mN/m. CMC and Minimum Surface Tension in Distilled Water values of surfactants can be measured by any suitable methods known in the art, for example those methods described in Principles of Colloid and Surface Chemistry, p 370-375, incorporated herein by reference.

It is also possible to use ammonium salts of the fast wetting surfactants with structure IIA above where $M=^+NH_4$, ethanolammonium, hydroxypropylammonium, N,N"-dimethylethanolammonium, 2-ammonium-2-methyl-propanol, $Mg^{2+}$, $Ca^{2+}$, $Zn^{2+}$, or $Al^{3+}$ as the crosslinking facilitator of the present invention. Similarly, the ammonium salts of structures IIA and IIB where M=the aforementioned ammonium species are also acceptable as crosslinking facilitators of the present invention. The aforementioned ammonium salts of structure V where R=methyl, ethyl, and propyl are also acceptable as crosslinking facilitators of the present invention. The aforementioned ammonium salts of alpha-olefin sulfonates and paraffin sulfonates produced via sulfochlorination or sulfoxidation are also acceptable as crosslinking facilitators of the present invention.

Additional non-limiting examples of fast wetting surfactants according to the present invention include ammonium salts of alcohol sulfates derived from branched alcohols such as ISALCHEM® and LIAL® alcohols (from Sasol) ie. DACPON® 27 23 AS and GUERBET® alcohols from Lucky Chemical. Still another example of a fast wetting surfactant includes paraffin sulfonates such as HOSTAPUR® SAS30 from Clariant.

Hueing Agents

The aqueous polymer melt compositions and/or filaments of the present invention may comprise one or more hueing agents. In one example, the total level of one or more hueing agents present within one or more, for example a plurality, of the fibrous elements of a fibrous structure of the present invention is less than 1% and/or less than 0.5% and/or less than 0.05% and/or less than 0.005% and/or greater than 0.00001% and/or greater than 0.0001% and/or greater than 0.001% by weight of the dry fibrous element and/or dry fibrous structure formed by fibrous elements containing the hueing agents. In one example, the total level of one or more hueing agents present within one or more, for example a plurality, of the fibrous elements of a fibrous structure of the present invention is from about 0.0001% to about 0.5% and/or from about 0.0005% to about 0.05% and/or from about 0.001% to about 0.05% and/or from about 0.001% to about 0.005% by weight of the dry fibrous element and/or dry fibrous structure formed by fibrous elements containing the hueing agents.

Hueing agents can be used either alone or in combination. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenyl-methane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Non-limiting examples of hueing agents include dyes, dye-clay conjugates, and organic and inorganic pigments and mixtures thereof. Suitable dyes include small molecule dyes and polymeric dyes. Suitable small molecule dyes include small molecule dyes selected from the group consisting of dyes falling into the Colour Index (C.I.) classifications of Direct, Basic, Reactive or hydrolysed Reactive, Solvent or Disperse dyes for example that are classified as Blue, Violet, Red, Green or Black, and mixtures thereof. In another aspect, suitable small molecule dyes include small molecule dyes selected from the group consisting of Colour Index (Society of Dyers and Colourists, Bradford, UK) numbers Direct Violet dyes such as 9, 35, 48, 51, 66, and 99, Direct Blue dyes such as 1, 71, 80 and 279, Acid Red dyes such as 17, 73, 52, 88 and 150, Acid Violet dyes such as 15, 17, 24, 43, 49 and 50, Acid Blue dyes such as 15, 17, 25, 29, 40, 45, 75, 80, 83, 90 and 113, Acid Black dyes such as 1, Basic Violet dyes such as 1, 3, 4, 10 and 35, Basic Blue dyes such as 3, 16, 22, 47, 66, 75 and 159, Disperse or Solvent dyes such as those described in US 2008/034511 A1 or U.S. Pat. No. 8,268,016 B2, or dyes as disclosed in U.S. Pat. No. 7,208,459 B2, and mixtures thereof. In another aspect, suitable small molecule dyes include small molecule dyes selected from the group consisting of C.I. Acid Violet 17, Direct Blue 71, Direct Violet 51, Direct Blue 1, Acid Red 88, Acid Red 150, Acid Blue 29, Acid Blue 113 or mixtures thereof.

Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof. Polymeric dyes include those described in WO2011/98355, US 2012/225803 A1, US 2012/090102 A1, U.S. Pat. No. 7,686,892 B2, and WO2010/142503.

In another aspect, suitable polymeric dyes include polymeric dyes selected from the group consisting of hueing agents commercially available under the trade name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® Violet CT, carboxymethyl cellulose (CMC) covalently bound to a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

Non-limiting examples of suitable hueing agents include the whitening agents found in WO 08/87497 A1, WO2011/011799 and US 2012129752 A1. In addition, other non-limiting examples of suitable hueing agents include dyes disclosed in these references, including those selected from Examples 1-42 in Table 5 of WO2011/011799. Other dyes disclosed in U.S. Pat. Nos. 8,138,222 and 7,090,890 B2 are also suitable hueing agents. Further examples of suitable whitening agents include whitening agents described in US2008034511 A1 (Unilever), for example "Violet 13."

Suitable dye clay conjugates include dye clay conjugates selected from the group comprising at least one cationic/basic dye and a smectite clay, and mixtures thereof. In another aspect, suitable dye clay conjugates include dye clay conjugates selected from the group Consisting of one cationic/basic dye selected from the group consisting of C.I. Basic Yellow 1 Through 108, C.I. Basic Orange 1 through 69, C.I. Basic Red 1 through 118, C.I. Basic Violet 1 Through 51, C.I. Basic Blue 1 through 164, C.I. Basic Green 1 through 14, C.I. Basic Brown 1 Through 23, CI Basic Black 1 through 11, and a clay selected from the group consisting of Montmorillonite clay, Hectorite clay, Saponite clay and mixtures thereof. In still another aspect, Suitable dye clay conjugates include dye clay conjugates selected from the group consisting of: Montmorillonite Basic Blue B7 C.I. 42595 conjugate, Montmorillonite Basic Blue B9 C.I. 52015 Conjugate, Montmorillonite Basic Violet V3 C.I. 42555 conjugate, Montmorillonite Basic Green G1 C.I. 42040 conjugate, Montmorillonite Basic Red R1 C.I. 45160 conjugate, Montmorillonite C.I. Basic Black 2 conjugate, Hectorite Basic Blue B7 C.I. 42595 conjugate, Hectorite Basic Blue B9 C.I. 52015 conjugate, Hectorite Basic Violet V3 C.I. 42555 conjugate, Hectorite Basic Green G1 C.I. 42040 conjugate, Hectorite Basic Red R1 C.I. 45160 conjugate, Hectorite C.I. Basic Black 2 conjugate, Saponite Basic Blue B7 C.I. 42595 conjugate, Saponite Basic Blue B9 C.I. 52015 conjugate, Saponite Basic Violet V3 C.I. 42555 conjugate, Saponite Basic Green G1 C.I. 42040 conjugate, Saponite Basic Red R1 C.I. 45160 conjugate, Saponite C.I. Basic Black 2 conjugate and mixtures thereof.

Suitable pigments include pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by C1-C3-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof.

In another example, suitable pigments include pigments selected from the group consisting of Ultramarine Blue (C.I. Pigment Blue 29), Ultramarine Violet (C.I. Pigment Violet 15) and mixtures thereof.

Solid Additives

The fibrous structures and/or sanitary tissue products of the present invention may further comprise one or more solid additives. "Solid additive" as used herein means an additive that is capable of being applied to a surface of a fibrous structure or nonwoven substrate component of the fibrous structure in a solid form. In other words, the solid additive of the present invention can be delivered directly to a surface of a nonwoven substrate without a liquid phase being present, i.e. without melting the solid additive and without suspending the solid additive in a liquid vehicle or carrier. As such, the solid additive of the present invention does not require a liquid state or a liquid vehicle or carrier in order to be delivered to a surface of a nonwoven substrate. The solid additive of the present invention may be delivered via a gas or combinations of gases. In one example, in simplistic terms, a solid additive is an additive that when placed within a container, does not take the shape of the container. In one example, a solid additive comprises a naturally occurring fiber, such as a pulp fiber.

The solid additives of the present invention may have different geometries and/or cross-sectional areas that include round, elliptical, star-shaped, rectangular, trilobal and other various eccentricities.

In one example, the solid additive may exhibit a particle size of less than 6 mm and/or less than 5.5 mm and/or less than 5 mm and/or less than 4.5 mm and/or less than 4 mm and/or less than 2 mm in its maximum dimension.

"Particle" as used herein means an object having an aspect ratio of less than about 25/1 and/or less than about 15/1 and/or less than about 10/1 and/or less than 5/1 to about 1/1. A particle is not a fiber as defined herein.

The solid additives may be present in the fibrous structures of the present invention at a level of greater than about 1 and/or greater than about 2 and/or greater than about 4 and/or to about 20 and/or to about 15 and/or to about 10 $g/m^2$. In one example, a fibrous structure of the present invention comprises from about 2 to about 10 and/or from about 5 to about 10 $g/m^2$ of solid additive.

In one example, the solid additives are present in the fibrous structures of the present invention at a level of greater than 5% and/or greater than 10% and/or greater than 20% to about 50% and/or to about 40% and/or to about 30%.

Scrim Material

The fibrous structure and/or sanitary tissue product may further comprise a scrim material. The scrim material may comprise any suitable material capable of bonding to the nonwoven substrate of the present invention. In one example, the scrim material comprises a material that can be thermally bonded to the nonwoven substrate of the present invention. Non-limiting examples of suitable scrim materials include filaments of the present invention. In one example, the scrim material comprises filaments that comprise hydroxyl polymers. In another example, the scrim material comprises starch filaments. In yet another example, the scrim material comprises filaments comprising a thermoplastic polymer. In still another example, the scrim material comprises a fibrous structure according to the present invention wherein the fibrous structure comprises filaments comprising hydroxyl polymers, such as starch filaments, and/or thermoplastic polymers. In another example, the scrim material may comprise a film. In another example, the scrim material may comprise a nonwoven substrate according to the present invention. In even another example, the scrim material may comprise a latex.

In one example, the scrim material may be the same composition as the nonwoven substrate.

The scrim material may be present in the fibrous structures of the present invention at a basis weight of greater than 0.1 and/or greater than 0.3 and/or greater than 0.5 and/or greater than 1 and/or greater than 2 $g/m^2$ and/or less than 10 and/or less than 7 and/or less than 5 and/or less than 4 $g/m^2$ as determined by the Basis Weight Test Method described herein.

Methods of the Present Invention

The methods of the present invention relate to producing filaments from aqueous polymer melt compositions comprising a fibrous element-forming polymer, such as a hydroxyl polymer, a crosslinking agent, such as dihydroxyethyleneurea (DHEU), and a crosslinking facilitator, such as an ammonium alkylsulfonate salt.

Methods for Making Fibrous Structure

Figure 2:
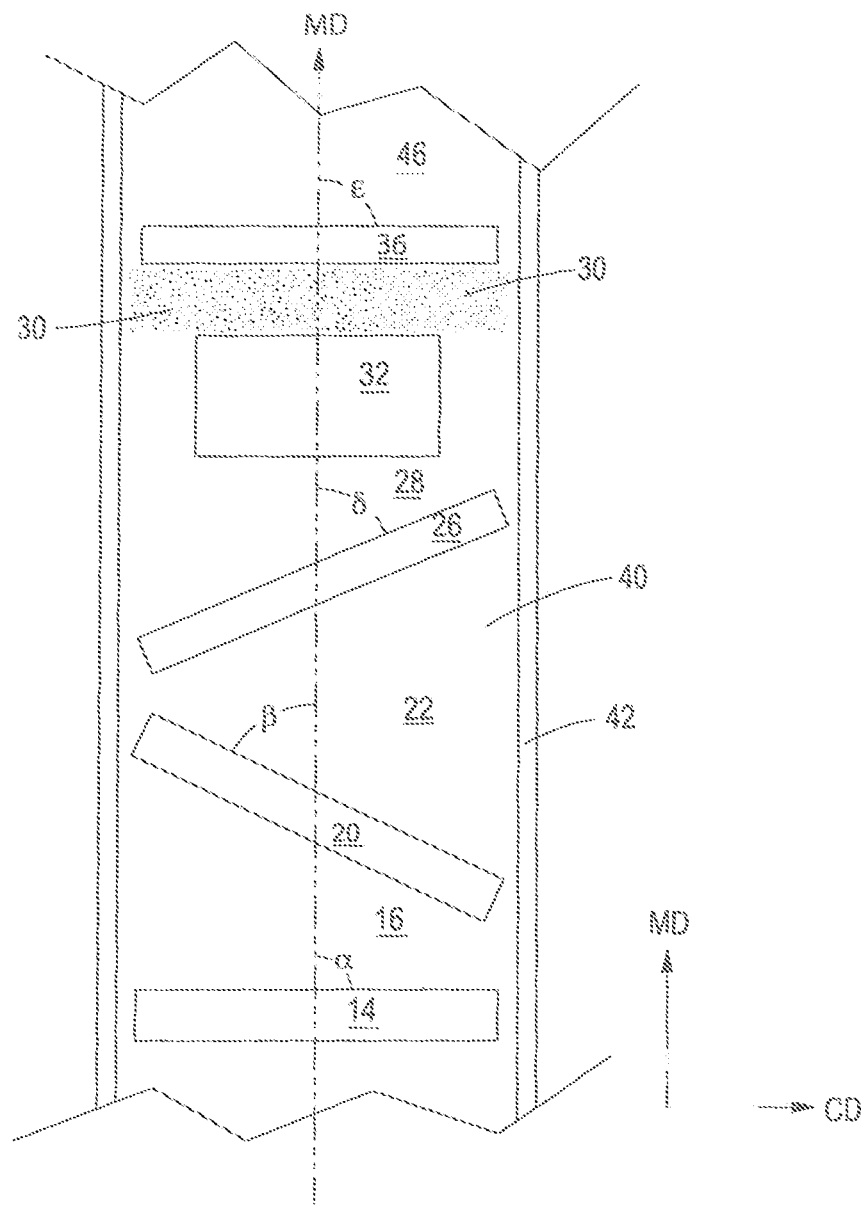
FIG. 2 is a schematic representation of one example of a portion of fibrous structure making process according to the present invention.

FIGS. 1 and 2 illustrate one example of a method for making a fibrous structure of the present invention. As shown in FIGS. 1 and 2, the method 10 comprises the steps of:

a. providing first filaments 12 from a first source 14 of filaments, which form a first layer 16 of filaments;

b. providing second filaments 18 from a second source 20 of filaments, which form a second layer 22 of filaments;

c. providing third filaments 24 from a third source 26 of filaments, which form a third layer 28 of filaments;

d. providing solid additives 30 from a source 32 of solid additives;

e. providing fourth filaments 34 from a fourth source 36 of filaments, which form a fourth layer 38 of filaments; and f. collecting the first, second, third, and fourth filaments 12, 18, 24, 34 and the solid additives 30 to form a fibrous structure 40, wherein the first source 14 of filaments is oriented at a first angle $\alpha$ to the machine direction of the fibrous structure 40, the second source 20 of filaments is oriented at a second angle $\beta$ to the machine direction different from the first angle $\alpha$, the third source 26 is oriented at a third angle $\beta$ to the machine direction different from the first angle $\alpha$ and the second angle $\beta$, and wherein the fourth source 36 is oriented at a fourth angles to the machine direction different from the second angle $\beta$ and third angle $\delta$.

The first, second, and third layers 16, 22, 28 of filaments are collected on a collection device 42, which may be a belt or fabric. The collection device 42 may be a patterned belt that imparts a pattern, such as a non-random, repeating pattern to the fibrous structure 40 during the fibrous structure making process. The first, second, and third layers 16, 22, 28 of filaments are collected (for example one on top of the other) on the collection device 42 to form a multi-layer nonwoven substrate 44 upon which the solid additives 30 are deposited. The fourth layer 38 of filaments may then be deposited onto the solid additives 30 to form a scrim 46.

The first angle $\alpha$ and the fourth angles may be the same angle, for example 90° to the machine direction.

The second angle $\beta$ and the third angle $\beta$ may be the same angle, just positive and negative of one another. For example the second angle $\beta$ may be −40° to the machine direction and the third angle $\delta$ may be +40° to the machine direction.

In one example, at least one of the first, second, and third angles $\alpha$, $\beta$, $\delta$ is less than 90° to the machine direction. In another example, the first angle $\alpha$ and/or fourth angle $\epsilon$ is about 90° to the machine direction. In still another example, the second angle $\beta$ and/or third angle $\beta$ is from about ±10° to about ±80° and/or from about ±30° to about ±60° to the machine direction and/or about ±40° to the machine direction.

In one example, the first, second, and third layers 16, 22, 28 of filaments may be formed into a nonwoven substrate 44 prior to being utilized in the process for making a fibrous structure described above. In this case, the nonwoven substrate 44 would likely be in a parent roll that could be unwound into the fibrous structure making process and the solid additives 30 could be deposited directly onto a surface of the nonwoven substrate 44.

In one example, the step of providing a plurality of solid additives 30 onto the nonwoven substrate 44 may comprise airlaying the solid additives 30 using an airlaying former. A non-limiting example of a suitable airlaying former is available from Dan-Web of Aarhus, Denmark.

In one example, the step of providing fourth filaments 34 such that the filaments contact the solid additives 30 comprises the step of depositing the fourth filaments 34 such that at least a portion (in one example all or substantially all) of the solid additives 30 are contacted by the fourth filaments 34 thus positioning the solid additives 30 between the fourth layer 38 of filaments and the nonwoven substrate 44. Once the fourth layer 38 of filaments is in place, the fibrous structure 40 may be subjected to a bonding step that bonds the fourth layer 38 of filaments (in this case, the scrim 46) to the nonwoven substrate 44. This step of bonding may comprise a thermal bonding operation. The thermal bonding operation may comprise passing the fibrous structure 40 through a nip formed by thermal bonding rolls 48, 50. At least one of the thermal bonding rolls 48, 50 may comprise a pattern that is translated into the bond sites 52 formed in the fibrous structure 40.

In addition to being subjected to a bonding operation, the fibrous structure may also be subjected to other post-processing operations such as embossing, tuft-generating, gear rolling, which includes passing the fibrous structure through a nip formed between two engaged gear rolls, moisture-imparting operations, free-fiber end generating, and surface treating to form a finished fibrous structure. In one example, the fibrous structure is subjected to gear rolling by passing the fibrous structure through a nip formed by at least a pair of gear rolls. In one example, the fibrous structure is subjected to gear rolling such that free-fiber ends are created in the fibrous structure. The gear rolling may occur before or after two or more fibrous structures are combined to form a multi-ply sanitary tissue product. If it occurs after, then the multi-ply sanitary tissue product is passed through the nip formed by at least a pair of gear rolls.

The method for making a fibrous structure of the present invention may be close coupled (where the fibrous structure is convolutedly wound into a roll prior to proceeding to a converting operation) or directly coupled (where the fibrous structure is not convolutedly wound into a roll prior to proceeding to a converting operation) with a converting operation to emboss, print, deform, surface treat, or other post-forming operation known to those in the art. For purposes of the present invention, direct coupling means that the fibrous structure can proceed directly into a converting operation rather than, for example, being convolutedly wound into a roll and then unwound to proceed through a converting operation.

In one example, one or more plies of the fibrous structure according to the present invention may be combined, for example with glue, with another ply of fibrous structure, which may also be a fibrous structure according to the present invention, to form a multi-ply sanitary tissue product that exhibits a Tensile Ratio of 2 or less and/or less than 1.7 and/or less than 1.5 and/or less than 1.3 and/or less than 1.1 and/or greater than 0.7 and/or greater than 0.9 as measured according to the Dry Tensile Test Method described herein. In one example, the multi-ply sanitary tissue product may be formed by combining two or more plies of fibrous structure according to the present invention. In another example, two or more plies of fibrous structure according to the present invention may be combined to form a multi-ply sanitary tissue product such that the solid additives present in the fibrous structure plies are adjacent to each of the outer surfaces of the multi-ply sanitary tissue product.

The process of the present invention may include preparing individual rolls of fibrous structure and/or sanitary tissue product comprising such fibrous structure(s) that are suitable for consumer use.

Figure 3:
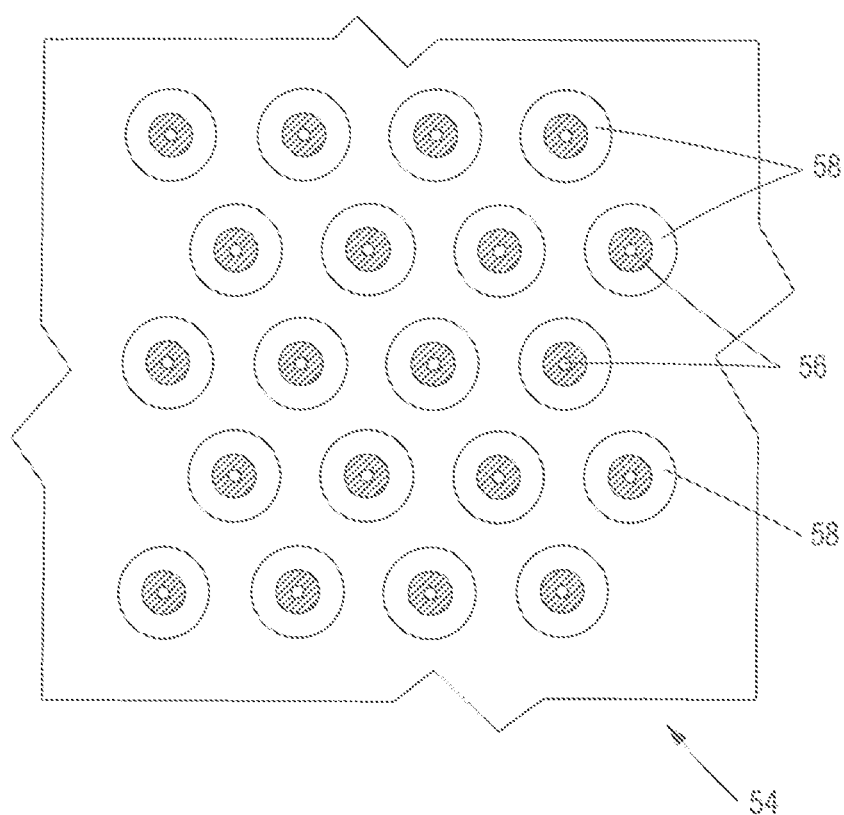
FIG. 3 is a schematic representation of an example of a meltblow die in accordance with the present invention.
Figure 4A:
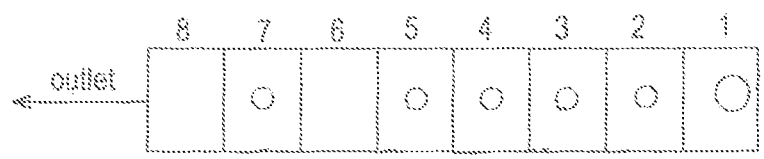
FIG. 4A is a schematic representation of an example of a barrel of a twin screw extruder in accordance with the present invention.
Figure 4B:
FIG. 4B is a schematic representation of an example of a screw and mixing element configuration for the twin screw extruder of FIG. 4A.

In one example, the sources of filaments comprise melt-blow dies that produce filaments from an aqueous polymer melt composition according to the present invention. In one example, as shown in FIG. 3 the meltblow die 54 may comprise at least one filament-forming hole 56, and/or 2 or more and/or 3 or more rows of filament-forming holes 56 from which filaments are spun. At least one row of the filament-forming holes 56 contains 2 or more and/or 3 or more and/or 10 or more filament-forming holes 56. In addition to the filament-forming holes 56, the meltblow die 54 comprises fluid-releasing holes 58, such as gas-releasing holes, in one example air-releasing holes, that provide attenuation to the filaments formed from the filament-forming holes 56. One or more fluid-releasing holes 58 may be associated with a filament-forming hole 56 such that the fluid exiting the fluid-releasing hole 58 is parallel or substantially parallel (rather than angled like a knife-edge die) to an exterior surface of a filament exiting the filament-forming hole 56. In one example, the fluid exiting the fluid-releasing hole 58 contacts the exterior surface of a filament formed from a filament-forming hole 56 at an angle of less than 30° and/or less than 20° and/or less than 10° and/or less than 5° and/or about 0°. One or more fluid releasing holes 58 may be arranged around a filament-forming hole 56. In one example, one or more fluid-releasing holes 58 are associated with a single filament-forming hole 56 such that the fluid exiting the one or more fluid releasing holes 58 contacts the exterior surface of a single filament formed from the single filament-forming hole 56. In one example, the fluid-releasing hole 58 permits a fluid, such as a gas, for example air, to contact the exterior surface of a filament formed from a filament-forming hole 56 rather than contacting an inner surface of a filament, such as what happens when a hollow filament is formed.

Aqueous Polysaccharide Melt Composition

The aqueous polysaccharide melt composition of the present invention from which the polysaccharide filaments are produced comprises a melt processed fibrous element-forming polymer, such as a melt processed hydroxyl polymer, for example a melt processed polysaccharide, and a crosslinking system comprising a crosslinking agent and a crosslinking facilitator, such as an ammonium alkylsulfonate salt and/or acid thereof, according to the present invention.

The aqueous polysaccharide melt compositions may already be formed or a melt processing step may need to be performed to convert a raw material fibrous element-forming polymer, such as a polysaccharide, into a melt processed fibrous element-forming polymer, such as a melt processed polysaccharide, thus producing the aqueous polysaccharide melt composition. A peak processing temperature to bring the aqueous polysaccharide melt composition to between 170 to 175° C. should be applied to the aqueous polysaccharide melt composition. This can be accomplished by heating through the barrel heating of a twin screw extruder or using a shell in tube heat exchanger. The aqueous polysaccharide melt composition should be held at 170 to 175° C. for 1 to 2 minutes. If the aqueous polysaccharide melt composition is at a peak temperature between 170 and 175° C. for residence times longer than 2 minutes unwanted side reactions may occur. Thus it is important to very quickly cool the aqueous polysaccharide melt composition using a rapid quenching method, such as flash vaporization of the water phase. The crosslinking agent is added to the aqueous polysaccharide melt composition after the cooling step. A suitable melt processing step known in the art may be used to convert the raw material fibrous element-forming polymer, for example the polysaccharide, into the melt processed fibrous element-forming polysaccharide. "Melt processing" as used herein means any operation and/or process by which a polymer is softened to such a degree that it can be brought into a flowable state.

The aqueous polysaccharide melt compositions of the present invention may have a shear viscosity, as measured according to the Shear Viscosity of a Polymer Melt Composition Measurement Test Method described herein, of from about 0.5 Pascal·Seconds to about 25 Pascal·Seconds and/or from about 2 Pascal·Seconds to about 20 Pascal·Seconds and/or from about 3 Pascal·Seconds to about 10 Pascal·Seconds, as measured at a shear rate of 3,000 sec$^{-1}$ and at the processing temperature (50° C. to 100° C.). The aqueous polysaccharide melt compositions may have a thinning index n value as measured according to the Shear Viscosity of a Polymer Melt Composition Measurement Test Method described herein of from about 0.4 to about 1.0 and/or from about 0.5 to about 0.8.

The aqueous polysaccharide melt compositions may have a temperature of from about 50° C. to about 100° C. and/or from about 65° C. to about 95° C. and/or from about 70° C. to about 90° C. when spinning filaments from the aqueous polysaccharide melt compositions.

In one example, the aqueous polysaccharide melt composition of the present invention may comprise from about 30% and/or from about 40% and/or from about 45% and/or from about 50% to about 75% and/or to about 80% and/or to about 85% and/or to about 90% and/or to about 95% and/or to about 99.5% by weight of the aqueous polysaccharide melt composition of a fibrous element-forming polymer, such as a polysaccharide. The fibrous element-forming polymer, such as a polysaccharide, may have a weight average molecular weight greater than 100,000 g/mol as determined by the Weight Average Molecular Weight Test Method described herein prior to any crosslinking A fast wetting surfactant may be present in the aqueous polysaccharide melt compositions and/or may be added to the aqueous polysaccharide melt composition before polymer processing of the aqueous polysaccharide melt composition.

A non-hydroxyl polymer, such as polyacrylamide, may be present in the aqueous polysaccharide melt composition and/or may be added to the aqueous polysaccharide melt composition before polymer processing of the aqueous polysaccharide melt composition.

A hueing agent may be present in the aqueous polysaccharide melt compositions and/or may be added to the aqueous polysaccharide melt composition before polymer processing the aqueous polymer melt composition. In one example, the fibrous structure comprises polysaccharide filaments comprising a hueing agent such that the fibrous structure exhibits a Whiteness Index of greater than 72 and/or greater than 75 and/or greater than 77 and/or greater than 80 as measured according to the Whiteness Index Test Method described herein.

Non-Limiting Examples

The materials used in the Examples are as follows:

CPI 050820-156 is an acid-thinned, dent corn starch with a weight average molecular weight of 2,000,000 g/mol supplied by Corn Products International, Westchester, Ill.

HYPERFLOC® NF301, a nonionic polyacrylamide (PAAM) has a weight average molecular weight between 5,000,000 and 6,000,000 g/mol, is supplied by Hychem, Inc., Tampa, Fla.

AEROSOL® MA-80-PG is an anionic sodium dihexyl sulfosuccinate surfactant supplied by Cytec Industries, Inc., Woodland Park, N.J.

Example 1—Comparative Example

In a 40:1 APV Baker twin-screw extruder ("cook extruder") with eight temperature zones, illustrated in FIGS.

4A and 4B, a 2.2 wt % NF301 PAAM solution is mixed with CPI 050820-156 starch, ammonium chloride, AEROSOL® MA-80-PG surfactant, and water in zone 1. This mixture is then conveyed down the barrel through zones 2 through 8 and cooked into a melt-processed hydroxyl polymer composition. The composition in the extruder is 42% water where the make-up of solids is 97.2% CPI 050820-156, 1.5% AEROSOL® MA-80-PG, and 0.8% HYPERFLOC® NF301 polyacrylamide, and 0.5% ammonium chloride. The extruder barrel temperature set points for each zone are shown in Table 2 below:

TABLE 2

| | Zone | | | | | | | |
|---|---|---|---|---|---|---|---|---|
| | 1 | 2 | 3 | 4 | 5 | 6 | 7 | 8 |
| Temperature (° C.) | 15 | 15 | 15 | 50 | 155 | 155 | 155 | 155 |

Figure 5A:
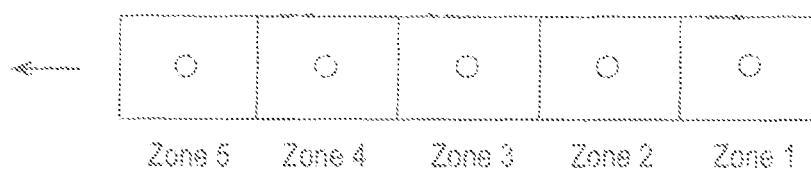
FIG. 5A is a schematic representation of an example of a barrel of a twin screw extruder suitable for use in the present invention.
Figure 5B:
FIG. 5B is a schematic representation of an example of a screw and mixing element configuration suitable for use in the barrel of FIG. 5A.

The temperature of the aqueous polysaccharide melt composition exiting the 40:1 extruder is between 148 and 152° C. From the extruder, the aqueous polysaccharide melt composition is fed to a Mahr gear pump, and then delivered to a second extruder (a "flash extruder"), an example of which is illustrated in FIGS. 5A and 5B. The second extruder is a 13:1 APV Baker twin screw, which serves to cool the melt by venting a stream to atmospheric pressure. The second extruder also serves as a location for additives to the aqueous polysaccharide melt composition. Particularly, a second stream of 2.2 wt % HYPERFLOC® NF301 polyacrylamide is introduced at a level of 0.3% on a solids basis. This raises the total HYPERFLOC® NF301 level to 1.1% of the solids. The material that is not vented is conveyed down the extruder to a second Mahr melt pump. From here, the aqueous polysaccharide melt composition is delivered to a series of static mixers where a crosslinking agent, crosslinking facilitator, and water are added. The aqueous polysaccharide melt composition at this point in the process is 50-55% total solids. On a solids basis the aqueous polysaccharide melt composition is comprised of 90.5% CPI 050820-156 starch, 5% crosslinking agent, 2% ammonium chloride (crosslinking facilitator), 1.5% surfactant, and 1.0% HYPERFLOC® NF301 PAAM. From the static mixers the aqueous polysaccharide melt composition is delivered to a melt blowing die via a melt pump. Polysaccharide filaments are produced from the aqueous polysaccharide melt composition by the melt blowing die. The filaments are collected on a collection device, such as a belt, for example a patterned belt, to produce a fibrous structure.

Figure 6:
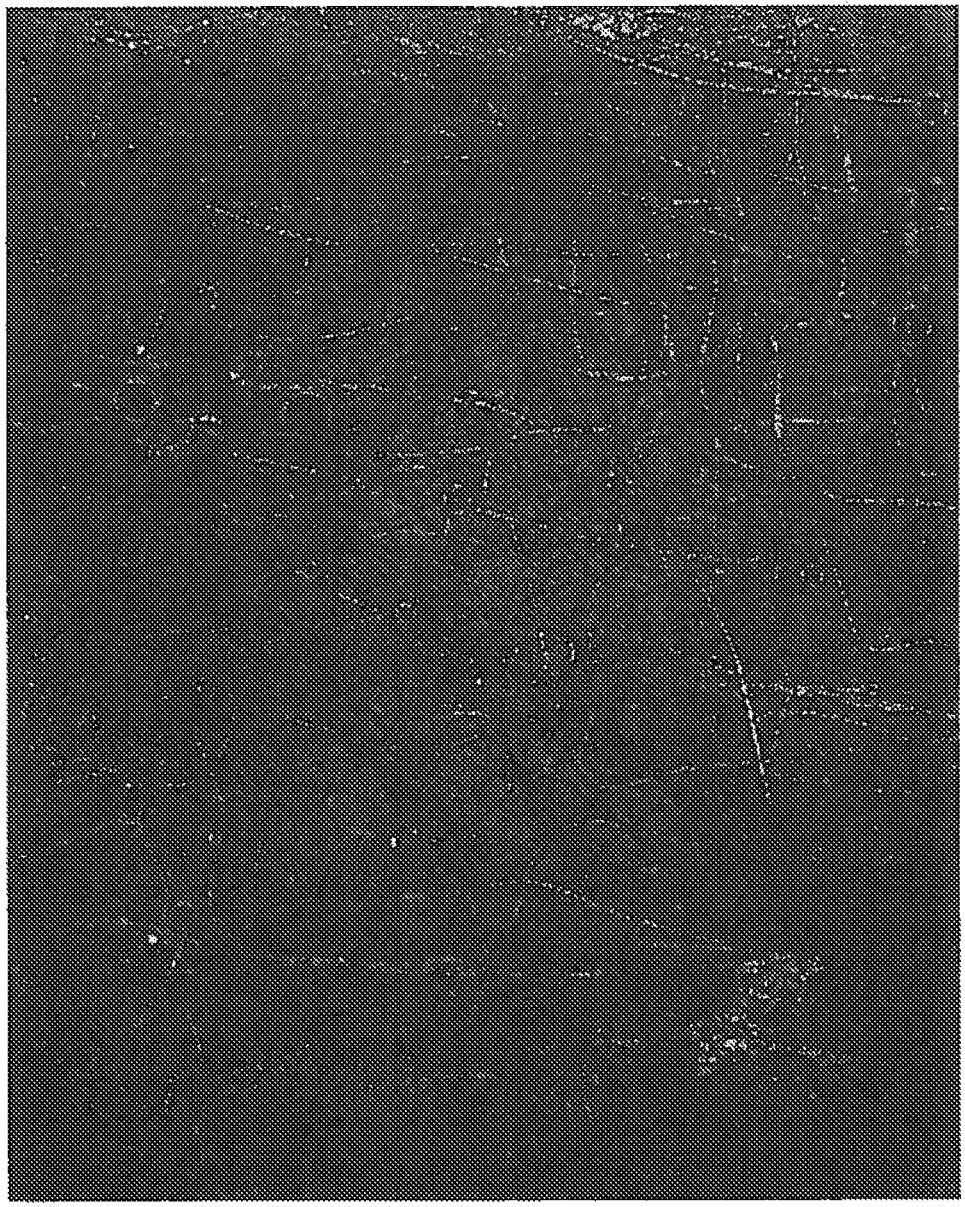
FIG. 6 is an image of a prior art fibrous structure containing polysaccharide filaments where less than 10% of the polysaccharide filaments in the fibrous structure exhibit birefringence as shown by the white portions of the filaments in the image.
Figure 7:
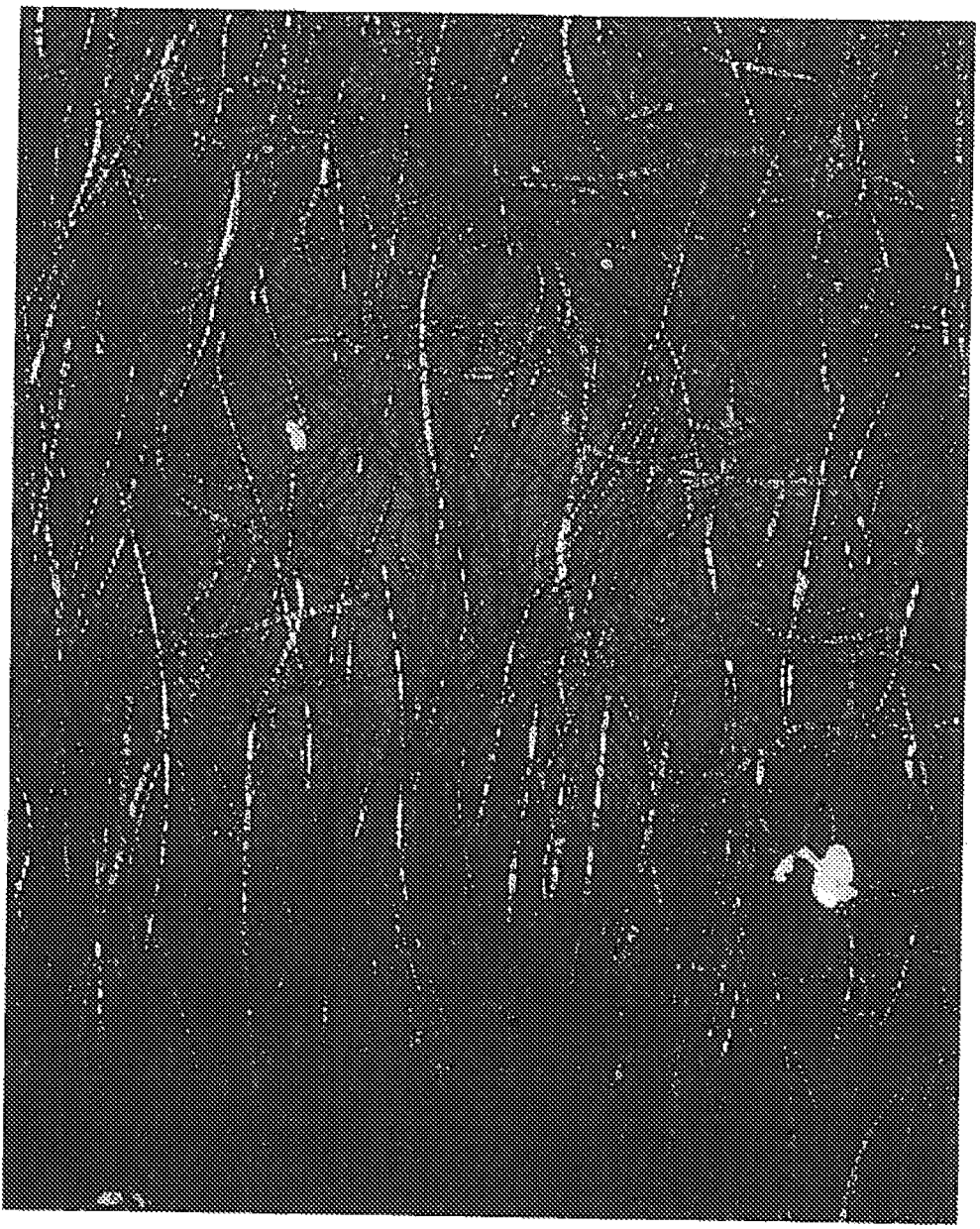
FIG. 7 is an image of an example of a fibrous structure of the present invention containing polysaccharide filaments where greater than 10% of the polysaccharide filaments in the fibrous structure exhibit birefringence as shown by the white portions of the filaments in the image.
Figure 8:
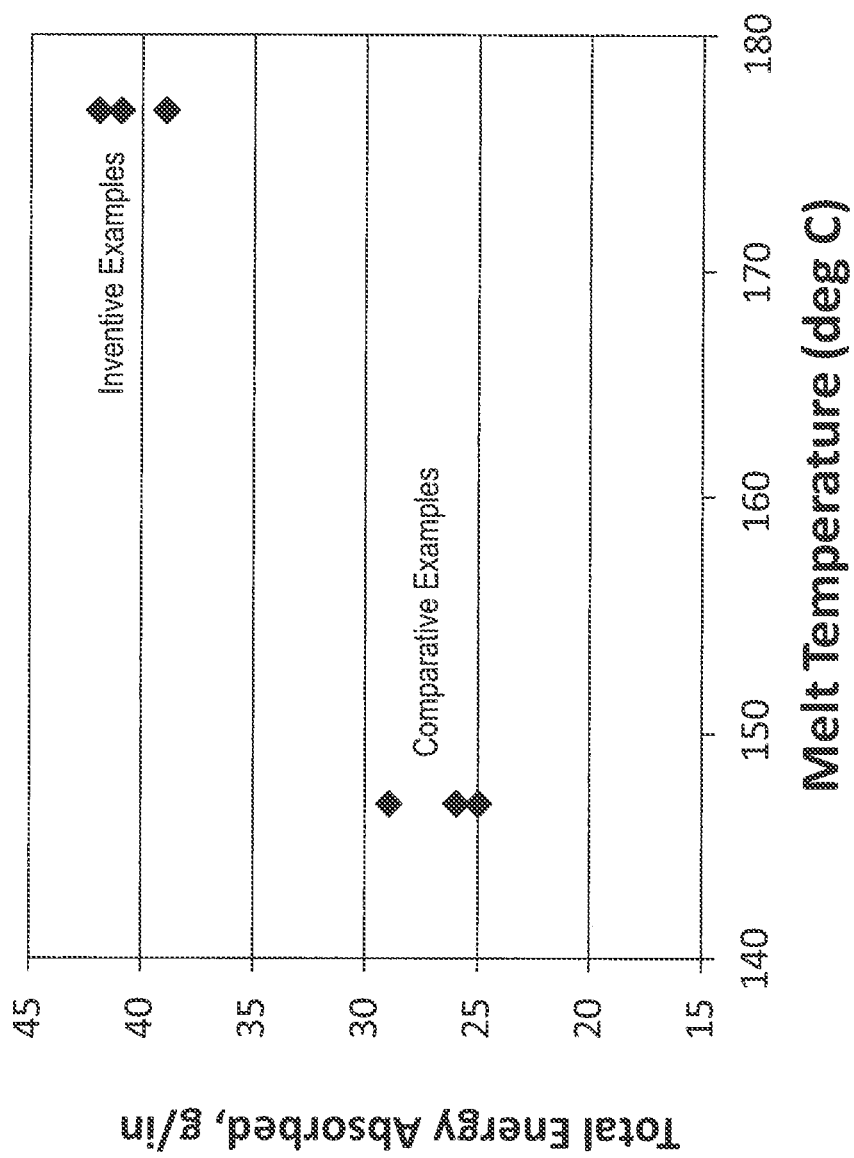
FIG. 8 is a graph that illustrates Fail TEA versus Melt Temperature of the aqueous polysaccharide melt composition used to produce examples of known fibrous structures (Comparative Examples) and examples of fibrous structures according to the present invention (Inventive Examples).

The resulting filaments display a low Elongation at Rupture of 86% as measured according to the Elongation at Rupture Test Method described herein, and show very little birefringence when pulled to failure as shown in FIG. 6. Less than 10% (9%) of the filaments display birefringence, and the retardance at 10% of pixels in images of the filaments is less than 2.5 nm as measured by the Birefringence Test Method described herein. The resulting fibrous structure exhibits a basis weight of 24 g/m², a Fail Total Energy Absorption (TEA) of 29 g/in, a Total Dry Tensile of 463 g/in, and a % Elongation of 20%.

Example 2—Inventive Example

An aqueous polysaccharide melt composition is prepared according to Example 1 except the aqueous polysaccharide melt composition is processed at a higher temperature. The cook extruder barrel temperature set points are changed to the values shown in the Table 3 below.

TABLE 3

| | Zone | | | | | | | |
|---|---|---|---|---|---|---|---|---|
| | 1 | 2 | 3 | 4 | 5 | 6 | 7 | 8 |
| Temperature (° C.) | 15 | 15 | 15 | 50 | 160 | 160 | 185 | 185 |

The temperature of the aqueous polysaccharide melt composition exiting the 40:1 extruder is between 170 and 175° C. The aqueous polysaccharide melt composition is held at 170 to 175° C. for 1 to 2 minutes. From here, the aqueous polysaccharide melt composition has HYPERFLOC® NF301 PAAM added in the flash extruder, and crosslinking agent and crosslinking facilitator added in the static mixers as described in Example 1. The resulting aqueous polysaccharide melt composition is 50-55% total solids. On a solids basis the aqueous polysaccharide melt composition is comprised of 91.1% CPI 050820-156 starch, 5% crosslinking agent, 2% ammonium chloride (crosslinking facilitator), 1.5% surfactant, 0.8% HYPERFLOC® NF221 PAAM, and 0.2% HYPERFLOC® NF301 PAAM. From the static mixers the aqueous polysaccharide melt composition is delivered to a melt blowing die via a melt pump. Polysaccharide filaments are produced from the aqueous polysaccharide melt composition by the melt blowing die. The filaments are collected on a collection device, such as a belt, for example a patterned belt, to produce a fibrous structure.

The resulting filaments display an Elongation at Rupture of 136% and display long, highly birefringent regions that have an aspect ratio >100 when pulled to failure. Greater than 10% (37%) of the filaments display birefringence, and 10% of pixels in images of the filaments exhibit a retardance of about 4 nm or greater as measured by the Birefringence Test Method. The resulting fibrous structure exhibits a basis weight of 24 g/m², a Fail Total Energy Absorption (TEA) of 39 g/in, a Total Dry Tensile of 525 On, and a % Elongation of 24%.

The higher melt processing temperature of Example 2 results in ductile failure rather than brittle failure of the polysaccharide filaments that have superior elongation properties than polysaccharide filaments melt blown from lower temperature cooked aqueous polysaccharide melt compositions.

Example 3—Inventive Example

An aqueous polysaccharide melt composition is prepared as described in Example 1 except the aqueous polysaccharide melt composition temperature is raised after the exit of the 40:1 extruder ("cook extruder") by using a shell in tube heat exchanger. The temperature of the aqueous polysaccharide melt composition exiting the cook extruder is between 148 and 152° C. The aqueous polysaccharide melt composition is then fed to a shell in tube heat exchanger, where the aqueous polysaccharide melt composition temperature is raised to 170 to 175° C. and held at that temperature for 1 to 2 minutes. From the heat exchanger, the aqueous polysaccharide melt composition has HYPERFLOC® NF301 PAAM added in the flash extruder, and crosslinking agent and crosslinking facilitator added in the static mixers as described in Example 1. The resulting aqueous polysaccharide melt composition is 50-55% total solids. On a solids basis the aqueous polysaccharide melt composition is comprised of 91.1% CPI 050820-156 starch, 5% crosslinking agent, 2% ammonium chloride (crosslinking facilitator), 1.5% surfactant, 0.8% HYPERFLOC® NF221 PAAM, and 0.2% HYPERFLOC® NF301 PAAM. From the static mixers the aqueous polysaccharide melt composition is delivered to a melt blowing die via a melt pump. Polysaccharide filaments are produced from the aqueous polysaccharide melt composition by the melt blowing die. The filaments are collected on a collection device, such as a belt, for example a patterned belt, to produce a fibrous structure.

The resulting polysaccharide filaments exhibit the same ductile failure and birefringent behavior as the polysaccharide filaments of Example 2.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 24 hours prior to the test. All plastic and paper board packaging articles of manufacture, if any, must be carefully removed from the samples prior to testing. The samples tested are "usable units." "Usable units" as used herein means sheets, flats from roll stock, pre-converted flats, fibrous structure, and/or single or multi-ply products. Except where noted all tests are conducted in such conditioned room, all tests are conducted under the same environmental conditions and in such conditioned room. Discard any damaged product. Do not test samples that have defects such as wrinkles, tears, holes, and like. All instruments are calibrated according to manufacturer's specifications.

Basis Weight Test Method

Basis weight of a fibrous structure is measured on stacks of twelve usable units using a top loading analytical balance with a resolution of ±0.001 g. The balance is protected from air drafts and other disturbances using a draft shield. A precision cutting die, measuring 8.890 cm±0.00889 cm by 8.890 cm±0.00889 cm is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in $g/m^2$ as follows:

Basis Weight=(Mass of stack)/[(Area of 1 square in stack)×(No. of squares in stack)]Basis Weight $(g/m^2)$=Mass of stack (g)/[79.032 $(cm^2)$/10,000 $(cm^2/m^2)$×12]

Report result to the nearest 0.1 $g/m^2$. Sample dimensions can be changed or varied using a similar precision cutter as mentioned above, so as at least 645 square centimeters of sample area is in the stack.

Average Diameter Test Method

A fibrous structure comprising filaments of appropriate basis weight (approximately 5 to 20 grams/square meter) is cut into a rectangular shape sample, approximately 20 mm by 35 mm. The sample is then coated using a SEM sputter coater (EMS Inc, PA, USA) with gold so as to make the filaments relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 μm/pixel. Images will typically show a distinct bimodal distribution in the intensity histogram corresponding to the filaments and the background. Camera adjustments or different basis weights are used to achieve an acceptable bimodal distribution. Typically 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.1) and the MATLAB Image Processing Tool Box (Version 3.) The image is first converted into a grayscale. The image is then binarized into black and white pixels using a threshold value that minimizes the intraclass variance of the thresholded black and white pixels. Once the image has been binarized, the image is skeltonized to locate the center of each fiber in the image. The distance transform of the binarized image is also computed. The scalar product of the skeltonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of filament diameters contained in the image.

Elongation/Tensile Strength/TEA/Tangent Modulus Test Method

Elongation (Stretch), Tensile Strength, TEA and Tangent Modulus are measured on a constant rate of extension tensile tester with computer interface (a suitable instrument is the EJA Vantage from the Thwing-Albert Instrument Co. Wet Berlin, N.J.) using a load cell for which the forces measured are within 10% to 90% of the limit of the load cell. Both the movable (upper) and stationary (lower) pneumatic jaws are fitted with smooth stainless steel faced grips, with a design suitable for testing 1 inch wide sheet material (Thwing-Albert item #733GC). An air pressure of about 60 psi is supplied to the jaws.

Eight usable units of fibrous structures are divided into two stacks of four usable units each. The usable units in each stack are consistently oriented with respect to machine direction (MD) and cross direction (CD). One of the stacks is designated for testing in the MD and the other for CD. Using a one inch precision cutter (Thwing-Albert JDC-1-10, or similar) take a CD stack and cut one, 1.00 in ±0.01 in wide by 3-4 in long stack of strips (long dimension in CD). In like fashion cut the remaining stack in the MD (strip's long dimension in MD), to give a total of 8 specimens, four CD and four MD strips. Each strip to be tested is one usable unit thick, and will be treated as a unitary specimen for testing.

Program the tensile tester to perform an extension test, collecting force and extension data at an acquisition rate of 20 Hz as the crosshead raises at a rate of 2.00 in/min (5.08 cm/min) until the specimen breaks. The break sensitivity is set to 80%, i.e., the test is terminated when the measured force drops to 20% of the maximum peak force, after which the crosshead is returned to its original position.

Set the gage length to 1.00 inch. Zero the crosshead and load cell. Insert the specimen into the upper and lower open grips such that at least 0.5 inches of specimen length is contained in each grip. Align specimen vertically within the upper and lower jaws, then close the upper grip. Verify specimen is aligned, then close lower grip. The specimen should be fairly straight between grips, with no more than 5.0 g of force on the load cell. Add a pre-tension force of 3 g. This tension is applied to the specimen to define the adjusted gauge length, and, by definition is the zero strain point. Start the tensile tester and data collection. Repeat testing in like fashion for all four CD and four MD specimens. Program the software to calculate the following from the constructed force (g) versus extension (in) curve.

Eight samples are run on the Tensile Tester (four to the MD and four to the CD) and average of the respective dry total tensile, dry Fail TEA and dry Fail Stretch is reported as the Dry Total Tensile, Dry Fail TEA and Dry Fail Stretch. Fail TEA is defined as tensile energy absorbed (area under the load vs. strain tensile curve) from zero strain to fail force point, with units of g/in. Dry Fail Stretch is defined as the percentage strain measured after the web is strained past its peak load point, where the force drops to exactly 50% of its peak load force.

The dry Fail TEA is then divided by the basis weight of the strip from which it was tested to arrive at the TEA of the present invention, and is calculated as follows:

TEA=Fail TEA/Basis Weight of Strip (g/m$^2$)

The MD and CD dry tensile strengths are determined using the above equipment and calculations in the following manner.

Tensile Strength in general is the maximum peak force (g) divided by the specimen width (1 in), and reported as g/in to the nearest 1 g/in.

Average Tensile Strength=sum of tensile loads measures(MD)/(Number of tensile stripes tested (MD)*Number of useable units or plys per tensile stripe)

This calculation is repeated for cross direction testing.

Dry Total Tensile=Average MD tensile strength+ Average CD tensile strength

The Dry Tensile value is then normalized for the basis weight of the strip from which it was tested. The normalized basis weight used is 24 g/m$^2$, and is calculated as follows:

Normalized{DTT}={DTT}*24 (g/m$^2$)/Basis Weight of Strip (g/m$^2$)

The various values are calculated for the four CD specimens and the four MD specimens. Calculate an average for each parameter separately for the CD and MD specimens.

Birefringence Test Method

To measure the degree of birefringence of filaments in a fibrous structure, the fibrous structure must first be conditioned at 23° C.±1.0° C. and 50%±10% Relative Humidity for at least 24 hours. The test is then conducted under the same conditions.

Any filaments containing 85% or less by weight of a polysaccharide and any fibers, if either are present, need to be removed from the fibrous structure before testing for birefringence. A manufacturer of the fibrous structure should run its fibrous structure making process in a manner that avoids adding filaments that contain 85% or less by weight of polysaccharides and fibers or other materials that are not filaments that contain greater than 85% by weight polysaccharides which may interfere with the birefringence testing.

The fibrous structure sample to be tested should exhibit a basis weight of 18 g/m$^2$±3 g/m$^2$. If the fibrous structure's basis weight is too low, then add more of the filaments comprising 85% or greater by weight of a polysaccharide, such as by folding and/or stacking and/or spinning more filaments onto the existing fibrous structure or making a higher basis weight fibrous structure initially. If the fibrous structure's basis weight is too high, then remove the filaments comprising 85% or greater by weight of a polysaccharide, such as by tape stripping and/or making a lower basis weight fibrous structure initially.

A fibrous structure sample (1.0 cm×1.5 cm) is cut, if necessary, from the fibrous structure to be tested. The fibrous structure sample is then immersed in Nikon immersion oil (Nd of 1.51) before placing the fibrous structure sample on a standard microscope slide and covered with a cover slip. Care is taken to minimize any air bubbles trapped in the fibrous structure sample and under the cover slip. The fibrous structure sample is then imaged on a Nikon 80i microscope (or equivalent) with 10× objective and universal air condenser with the condenser aperture at mid range and set in Kohler illumination. An Abrio Micro Imaging System (Hinds Instruments, Hillsboro, Oreg.) (or equivalent) is used to collect retardance and fast axis direction for each pixel in a 1.4 mega pixel image with a maximum retardation of 273 nm using 546 nm wavelength light. After a back ground image is collected on a portion of the slide with no fibrous structure sample (near the edge of the slide), twenty images for each fibrous structure sample are collected, taking care to avoid areas with any thermal bond points and bubbles in the immersion oil. The focus plane is set to correspond to the maximum number of filaments in focus, provided these filaments are near the center of the fibrous structure sample plane. The twenty images for each fibrous structure sample are then loaded into MATLAB computer programming environment using the PliReadRetFile function supplied by the manufacturer of the Abrio System. The histogram distributions of pixels are calculated for bins of 0.05 nm and 0.04 nm wide from 0 to 20 and 0 to 16 nm of retardance, respectively, for each image. These histograms are then normalized by the number of images taken and the pixel size of the image. Thus, a probability of 1 means that all pixels in all images are that particular retardation value.

Elongation at Rupture Test Method

To measure the Elongation at Rupture of a filament, the filament and/or fibrous structure from which the filament is obtained is conditioned at 23° C.±1.0° C. and 50%±10% Relative Humidity for at least 72 hours. All subsequent steps are done under the same environmental conditions.

If needed, filaments of sufficient length are isolated from the fibrous structure. The isolated filaments should not be birefringent, i.e. should not be stretched beyond their yield point before measurement. Care is taken not to damage the filaments during the isolation process. If a filament is damaged, discard and obtain another filament from the fibrous structure.

Filaments are tested using a Favimat tensile tester (Textechno Herbert Stein GmbH & Co. KG, Mönchengladbach, Germany), equipped with a 210 cN load cell with a resolution of $10^{-4}$ cN. Test parameters are set as follows: Gauge length=1 mm, test speed=10 mm/min, drop off force=95% of maximum. Tests where multiple filaments had been tested, as indicated by a stepwise drop off of force, need to be discarded. This test is repeated for 30 different filaments obtained from the same fibrous structure, and the average value for Elongation at Rupture of the filaments is reported to the nearest %.

Weight Average Molecular Weight Test Method

The weight average molecular weight (Mw) of a material, such as a hydroxyl polymer is determined by Gel Permeation Chromatography (GPC) using a mixed bed column. A high performance liquid chromatograph (HPLC) having the following components: Millenium®, Model 600E pump, system controller and controller software Version 3.2, Model 717 Plus autosampler and CHM-009246 column heater, all manufactured by Waters Corporation of Milford, Mass., USA, is utilized. The column is a PL gel 20 µm Mixed A column (gel molecular weight ranges from 1,000 g/mol to 40,000,000 g/mol) having a length of 600 mm and an internal diameter of 7.5 mm and the guard column is a PL gel 20 µm, 50 mm length, 7.5 mm ID. The column temperature is 55° C. and the injection volume is 200 µL. The detector is a DAWN® Enhanced Optical System (EOS) including Astra® software, Version 4.73.04 detector software, manufactured by Wyatt Technology of Santa Barbara, Calif., USA, laser-light scattering detector with K5 cell and 690 nm laser. Gain on odd numbered detectors set at 101. Gain on even numbered detectors set to 20.9. Wyatt Technology's Optilab® differential refractometer set at 50° C. Gain set at 10. The mobile phase is HPLC grade dimethylsulfoxide with 0.1% w/v LiBr and the mobile phase flow rate is 1 mL/min, isocratic. The run time is 30 minutes.

A sample is prepared by dissolving the material in the mobile phase at nominally 3 mg of material/1 mL of mobile phase. The sample is capped and then stirred for about 5 minutes using a magnetic stirrer. The sample is then placed in an 85° C. convection oven for 60 minutes. The sample is then allowed to cool undisturbed to room temperature. The sample is then filtered through a Sum Nylon membrane, type Spartan-25, manufactured by Schleicher & Schuell, of Keene, N.H., USA, into a 5 milliliter (mL) autosampler vial using a 5 mL syringe.

For each series of samples measured (3 or more samples of a material), a blank sample of solvent is injected onto the column. Then a check sample is prepared in a manner similar to that related to the samples described above. The check sample comprises 2 mg/mL of pullulan (Polymer Laboratories) having a weight average molecular weight of 47,300 g/mol. The check sample is analyzed prior to analyzing each set of samples. Tests on the blank sample, check sample, and material test samples are run in duplicate. The final run is a run of the blank sample.

The light scattering detector and differential refractometer is run in accordance with the "Dawn EOS Light Scattering Instrument Hardware Manual" and "Optilab® DSP Interferometric Refractometer Hardware Manual," both manufactured by Wyatt Technology Corp., of Santa Barbara, Calif., USA, and both incorporated herein by reference. The weight average molecular weight of the sample is calculated using the detector software. A dn/dc (differential change of refractive index with concentration) value of 0.066 is used. The baselines for laser light detectors and the refractive index detector are corrected to remove the contributions from the detector dark current and solvent scattering. If a laser light detector signal is saturated or shows excessive noise, it is not used in the calculation of the molecular mass. The regions for the molecular weight characterization are selected such that both the signals for the 90° detector for the laser-light scattering and refractive index are greater than 3 times their respective baseline noise levels. Typically the high molecular weight side of the chromatogram is limited by the refractive index signal and the low molecular weight side is limited by the laser light signal.

The weight average molecular weight can be calculated using a "first order Zimm plot" as defined in the detector software. If the weight average molecular weight of the sample is greater than 1,000,000 g/mol, both the first and second order Zimm plots are calculated, and the result with the least error from a regression fit is used to calculate the molecular mass. The reported weight average molecular weight is the average of the two runs of the material test sample.

Whiteness Index Test Method

Color (in this case Whiteness) is measured using a diffuse/8° sphere spectrophotometer (X-Rite SP62). The spectrophotometer is calibrated against a white and a black ceramic tile according to manufacturer's instructions and set to calculate Hunter values (L, a, b) with $C^2$ illuminant.

The color measurement of a fibrous structure is performed by stacking a two or more usable units of the fibrous structure on top of one another such that a basis weight of the stacked usable units of at least 100 g/m² is achieved for the area of the stack of usable units to be measured within the measurement area of the spectrophotometer. The stack of usable units is then placed flat against a white ceramic tile background.

Absolute color values of the fibrous structure are determined by taking the average of nine absolute color value measurements from both the top and the bottom surfaces on the stack of usable units.

Whiteness Index (WI) of the fibrous structure is calculated using the Stensby equation:

$$WI = L - 3b + 3a$$

Shear Viscosity of a Polymer Melt Composition Measurement Test Method

The shear viscosity of an aqueous polymer melt composition comprising a crosslinking system is measured using a capillary rheometer, Goettfert Rheograph 6000, manufactured by Goettfert USA of Rock Hill S.C., USA. The measurements are conducted using a capillary die having a diameter D of 1.0 mm and a length L of 30 mm (i.e., L/D=30). The die is attached to the lower end of the rheometer's 20 mm barrel, which is held at a die test temperature of 75° C. A preheated to die test temperature, 60 g sample of the aqueous polymer melt composition is loaded into the barrel section of the rheometer. Rid the sample of any entrapped air. Push the sample from the barrel through the capillary die at a set of chosen rates 1,000-10,000 seconds$^{-1}$. An apparent shear viscosity can be calculated with the rheometer's software from the pressure drop the sample experiences as it goes from the barrel through the capillary die and the flow rate of the sample through the capillary die. The log (apparent shear viscosity) can be plotted against log (shear rate) and the plot can be fitted by the power law, according to the formula $\eta = K\gamma^{n-1}$, wherein K is the material's viscosity constant, n is the material's thinning index and $\gamma$ is the shear rate. The reported apparent shear viscosity of the composition herein is calculated from an interpolation to a shear rate of 3,000 sec$^{-1}$ using the power law relation.

Polymer Melt Composition pH Test Method

A aqueous polymer melt composition pH is determined by adding 25 mL of the aqueous polymer melt composition to 100 mL of deionized water, stirring with a spatula for 1 min and measuring the pH.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fibrous structure comprising a plurality of filaments, wherein the plurality of filaments comprise greater than 85% by weight of a crosslinked unmodified starch, which has been formed using a crosslinking agent comprising dihydroxyethyleneurea and a crosslinking facilitator comprising an ammonium salt derived from an acid selected from the group consisting of: methanesulfonic acid, ethanesulfonic acid, propanesulfonic acid, isopropylsulfonic acid, butanesulfonic acid, isobutylsulfonic acid, sec-butylsulfonic acids, and trifluoromethanesulfonic acid, and mixtures thereof, such that 10% of pixels in images of the filaments exhibit a retardance of 3 nm or greater as measured according to the Birefringence Test Method, and wherein the fibrous structure further comprises one or more thermal bond sites.

2. The fibrous structure according to claim 1 wherein 10% of pixels in images of the filaments exhibit a retardance of about 4 nm or greater as measured according to the Birefringence Test Method.

3. The fibrous structure according to claim 1 wherein the filament further comprises a polysaccharide selected from the group consisting of: starch copolymers, chitosan, chitosan derivatives, chitosan copolymers, cellulose, cellulose derivatives, cellulose copolymers, hemicellulose, hemicellulose derivatives, hemicellulose copolymers, and mixtures thereof.

4. The fibrous structure according to claim 1 wherein at least one of the filaments comprises a polyacrylamide.

5. The fibrous structure according to claim 1 wherein at least one of the filaments comprises a surfactant.

6. The fibrous structure according to claim 5 wherein the surfactant comprises a fast wetting surfactant.

7. The fibrous structure according to claim 1 wherein the ammonium salt is derived from methanesulfonic acid.

8. The fibrous structure according to claim 1 wherein at least one of the filaments comprises a hueing agent.

9. The fibrous structure according to claim 1 wherein at least one of the filaments exhibits an average diameter of less than 50 μm as measured according to the Average Diameter Test Method.

10. The fibrous structure according to claim 1 wherein the fibrous structure further comprises a plurality of pulp fibers.

11. The fibrous structure according to claim 1 wherein the fibrous structure exhibits a Whiteness Index of greater than 72 as measured by the Whiteness Index Test Method.

12. The fibrous structure according to claim 1 wherein the fibrous structure exhibits a basis weight of from about 1 $g/m^2$ to about 5000 $g/m^2$ as measured according to the Basis Weight Test Method.

13. The fibrous structure according to claim 1 wherein the plurality of filaments comprise from about 0.1% to 5% by weight of the crosslinking facilitator.

\* \* \* \* \*